United States Patent
Trotta et al.

(10) Patent No.: US 9,280,576 B2
(45) Date of Patent: Mar. 8, 2016

(54) MANAGING LARGE DATASETS OBTAINED THROUGH A SURVEY-DATA-ACQUISITION PROCESS

(71) Applicant: HNTB HOLDINGS LTD., Kansas City, MO (US)

(72) Inventors: Brian William Trotta, Lenexa, KS (US); Paul James DiGiacobbe, Ridley Park, PA (US); Todd Dennis Rothermel, Gilbertsville, PA (US); Tommy Allen Stehle, Kansas City, MO (US); Timothy Faye Howerton, Overland Park, KS (US); Christopher Michael Siebern, Lafayette, IN (US); Adam Wesley Horn, Kansas City, MO (US)

(73) Assignee: HNTB HOLDINGS LTD., Kansas City, MO (US)

( * ) Notice: Subject to any disclaimer, the term of this patent is extended or adjusted under 35 U.S.C. 154(b) by 0 days.

(21) Appl. No.: 13/801,065

(22) Filed: Mar. 13, 2013

(65) Prior Publication Data
US 2013/0198146 A1 Aug. 1, 2013

Related U.S. Application Data

(62) Division of application No. 13/107,067, filed on May 13, 2011, now Pat. No. 8,429,195.

(51) Int. Cl.
*G06F 17/30* (2006.01)
(52) U.S. Cl.
CPC .............................. *G06F 17/30371* (2013.01)

(58) Field of Classification Search
CPC ....................................................... G06F 17/30
USPC .................................................. 707/600–899
See application file for complete search history.

(56) References Cited

U.S. PATENT DOCUMENTS

| | | | |
|---|---|---|---|
| 2008/0119970 A1* | 5/2008 | Campbell et al. | 701/8 |
| 2009/0256412 A1 | 10/2009 | Nieto et al. | |
| 2011/0054777 A1* | 3/2011 | Rossio et al. | 701/201 |
| 2011/0216063 A1* | 9/2011 | Hayes | 345/423 |

OTHER PUBLICATIONS

Notice of Allowance re U.S. Appl. No. 13/107,067, dated Dec. 24, 2012, 19 pages.

* cited by examiner

*Primary Examiner* — Isaac M Woo
(74) *Attorney, Agent, or Firm* — Shook, Hardy & Bacon L.L.P.

(57) ABSTRACT

The invention generally relates to enabling the management of survey data. One embodiment includes providing an upload description that describes characteristics of survey data to be uploaded, assigning a thread to process a group of files that store aspects of the survey data, dividing the file into data chunks, deriving from a given data chunk a corresponding data-integrity value and respectively associating the same with the given data chunk, communicating the data chunks to a remote storage device, utilizing the corresponding data-integrity values to ensure successful communication of the data chunk, and spatially storing the survey data such that it is retrievable upon a request that describes a geographic area of interest.

18 Claims, 22 Drawing Sheets

CLIENT PROCESSING

MANAGING LARGE DATASETS OBTAINED THROUGH A SURVEY-DATA-ACQUISITION PROCESS

CROSS REFERENCE TO RELATED APPLICATIONS

This application is a divisional of U.S. patent application Ser. No. 13/107,067, filed May 13, 2011, and entitled MANAGING LARGE DATASETS OBTAINED THROUGH A SURVEY-DATA-ACQUISITION PROCESS, which is herein incorporated by reference.

SUMMARY

This Summary is provided to introduce the reader to select concepts described below in the detailed description. It is not intended to define the invention (which is the purpose of the claims below) nor even to be used in isolation to help construe the meaning of the claims. One embodiment of our technology generally relates to managing and distributing massive amounts of survey data. In one embodiment, a point-cloud that represents real-world information is generated from high-fidelity laser scanning. The point cloud is used to facilitate three dimensional modeling of the as-built world (e.g., buildings, roadways, bridges). Our technology uploads collect sets of point-cloud data from acquisition systems to remote storage where the data is stored in a spatially indexed data store. Our technology allows the point-cloud data to be conveniently queried and retrieved from the data store.

BRIEF DESCRIPTION OF THE SEVERAL VIEWS OF THE DRAWING

Illustrative embodiments of the present invention are described in detail below with reference to the attached drawing figures, and wherein.

Introduction

Figure 1:
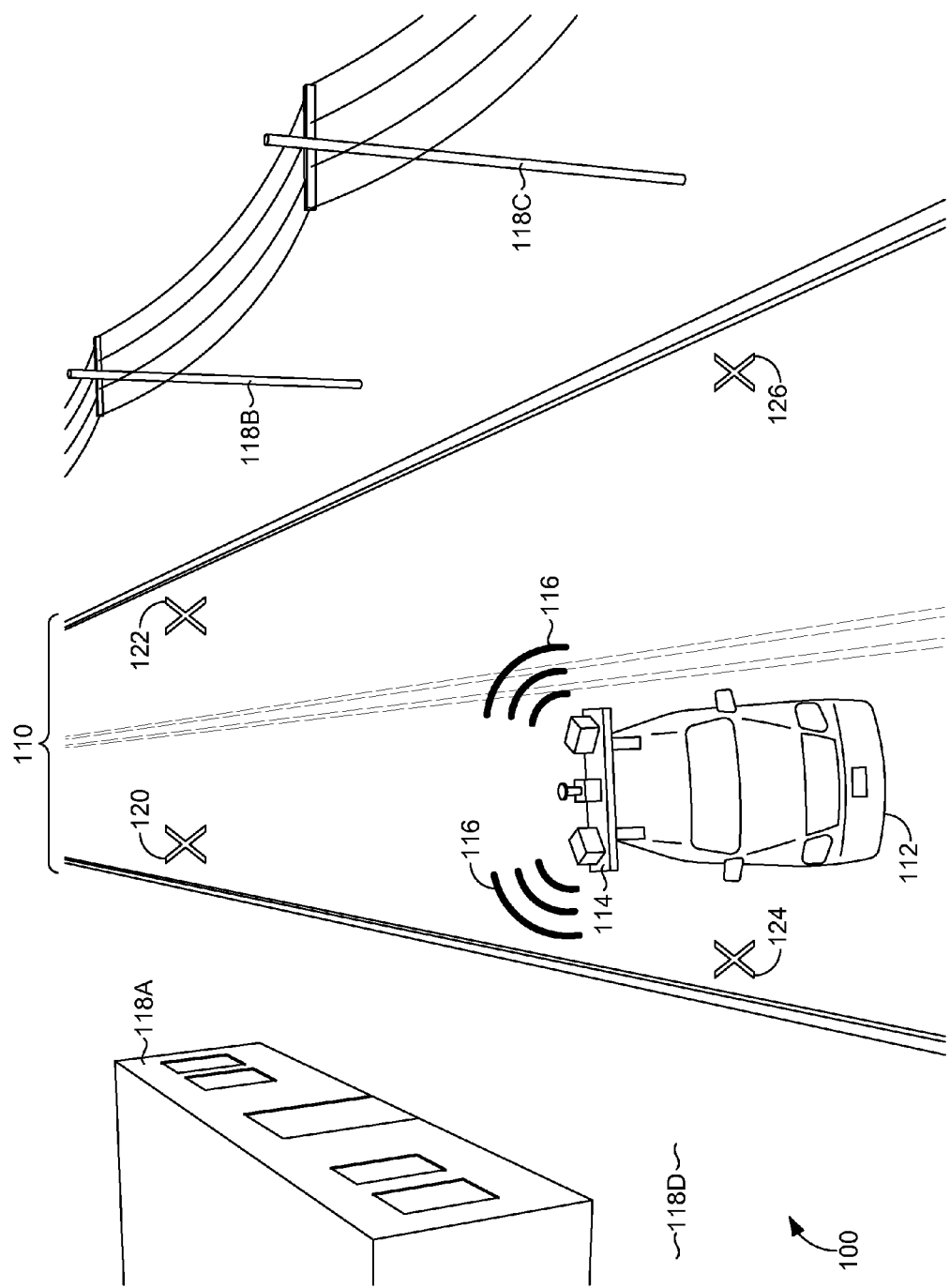
FIG. 1 depicts an illustrative operating environment suitable for acquiring survey data that is usable in an embodiment of the present invention.

A point-cloud is a set of points (vertices) arranged in a three-dimensional coordinate system. The points represent the surface of objects. Obtaining survey-quality point-cloud data is useful in being able to model exiting features of as-built conditions for design development. HNTB has developed a method to use LiDAR (light detection and ranging) technology to acquire and optimize point-cloud data so that it can obtain survey-quality accuracy. It can then be extracted and leveraged in project design work. An exemplary use case includes outfitting a vehicle with LiDAR capable capture equipment, and then driving this vehicle along a desired stretch of road to gather survey data about the road and its surroundings. In one embodiment, the result of the survey takes the form of a point-cloud dataset that is useable to present a three-dimensional representation of the real-world physical features in the space that was canvassed by the capture equipment. Example physical features include natural and artificial structures, topography, vegetation, and ground surface in the area surveyed.

The resultant datasets that are generated are often huge, on the order of tens of gigabytes and more. The resultant dataset needs to be made accessible to other entities and processes in order for its benefits to be realized. We have developed technology that, among other things, greatly increases the efficiency and manageability of the vast datasets that stem from a LiDAR data-acquisition process. The information in the datasets is made accessible to remote users so that they can retrieve and be presented survey-quality data of a given geographic area on demand.

DETAILED DESCRIPTION

The subject matter of the present invention is described with specificity to meet statutory requirements. The inventors have contemplated that the claimed subject matter might be embodied in ways other than those expressly described herein. Different steps, or combinations of steps similar to the ones described in this document, in conjunction with other present or future technologies might be used. Moreover, although the term "step" may be used herein to connote different elements of methods employed, the term should not be interpreted as implying any particular order among or between various steps herein disclosed unless and except when the order of individual steps is explicitly described.

Some embodiments of the invention take the form of computer-readable media that is embodied with computer-executable instructions that, when executed (e.g., by a computing device), facilitate a given method. Such computer-readable media itself is nontransitory, taking forms such as magnetic-storage media (e.g., memory, hard drives, solid-state storage devices) and optical-storage media (e.g., CDs, DVDs, etc.). The computer-executable instructions, or any other category of thing that is actually embodied on the media, might be stored instantaneously, short-term, or permanently, as the case may be, so as to effect an embodiment of the invention. Exemplary computing devices include mobile devices (phones, PDAs, pads, etc.), PCs, servers, and the like.

Below is a table of acronyms or short-hand notations that occur in this document:
 ALS Airborne LiDAR System
 GIS Geographic Information System
 HDS High Definition Survey
 IMU/INS Inertial Measurement Unit/Navigation Unit System
 LAN Local Area Network
 LAS file LiDAR Data Exchange file
 LiDAR Light Detection And Ranging
 MMS Mobile Mapping System
 SHP GIS software shape file
 WAN Wide Area Network Embodiments of the present invention generally relate to managing vast amounts of data such as survey data and communicating the same to a remote storage. The survey data stems from a light detection and ranging ("LiDAR") data-acquisition process in one embodiment. This leads to a generation of a raw point-cloud dataset. The raw point-cloud data set may be optimized to produce survey-quality data that is ultimately uploaded (though the raw data could be uploaded as well) to the remote storage facility. In one embodiment, "survey-quality data" is that which is within what is known in the art as "0.03° root mean square ("RMS") Error." This refers to the statistical computation of independent quality check points as they are compared to the LiDAR data. The data can then be leveraged by remote users, who, for example, might want to receive survey data associated with a defined geographic area.

Our technology includes a mission-planning process that is used to plan the way that survey data is obtained along a route so as to ultimately be able to optimize the data to the desired level of precision and accuracy. When we use the term "route" herein, we do not mean to limit the term to its more narrow sense, such as a roadway or pathway. Rather, a route can be any geographic area that is bounded or not bounded, created or not created, and can be defined along land, water, air, or a combination of the three. In the art, a route may alternatively be referred to as a linear element or alignment.

Turning now to FIG. 1, an exemplary operating environment 100 that is suitable for gathering data according to an embodiment of the our technology is shown. Although watercraft, aircraft, etc., can be used, operating environment 100 shows a vehicle 112 that is outfitted with LiDAR capture equipment 114 traveling down a road 110. In this example, the road is the route. The vehicle 112 may be referred to alternatively as a mobile mapping system ("MMS"). The MMS may combine LiDAR sensors, GPS navigation, inertial measuring, and digital imaging to generate a point-cloud of surrounding geography.

The LiDAR capture equipment 114 gathers data about the surrounding area as vehicle 112 traverses road 110. Optical remote-sensing devices within the capture equipment 114 emit laser pulses 116 that reflect off surrounding items and return to the capture equipment 114 in a way that allows the data to be utilized to create a point-cloud of physical features in the surrounding environment. By way of example, the LiDAR capture equipment 114 will generate data points that describe the geometry of the line-of-sight surfaces on building 118A. This is also true with respect to telephone poles 118B and 118C. Anything within the LiDAR line of sight, including surrounding area 118D and road 110, can be captured using the capture equipment 114.

Our technology also leverages survey control points. Exemplary survey control points are shown by reference numerals 120, 122, 124, and 126. Survey characteristics (e.g., elevation, GPS coordinates) of these control points are known to a given accuracy. We advance the art by preplanning the use of these control points so that as the point-cloud data is gathered, it will ultimately be able to be benchmarked and corrected based on the characteristics of the control points. The control points are prepositioned in advance of vehicle 112 traversing road 110 so that the control points appear within the point-cloud data. Further, the amount of control points selected and the distance between control points allow the raw point-cloud data to be optimized to the desired accuracy. The control points may be placed as part of a control survey performed by a registered or professional surveyor. In one embodiment, a minimum of 20 control points are used per project, with a minimum of 10 control points per mile of route. The 10 control points should be distributed to reflect the geographic area of interest and the distribution of error in the dataset. The root mean square error ("RMS") method at 95% confidence interval may be used to prove the horizontal and vertical accuracies. The 95% confidence interval allows one of the twenty points to fail. In one embodiment, the GPS measurements should be made with a PDOP (Positional (3D) Dilution of Precision) of less than 3.0 with a cutoff angle of 15°. Other methods of calculating dilution of precision may be used in accuracy calculation including horizontal, vertical, and time dilution of precision.

In one embodiment, vehicle 112 traverses road 110 twice (once in each direction), obtaining raw point-cloud data both times. The data that is obtained in both the first direction and the second direction is used to further increase the measured accuracy. This further enhances an ability to collect good raw data. In one embodiment, the information is collected as strips. The size of the strips may vary depending on the collection mechanism. Even if the point-cloud data initially starts with a relatively low accuracy, such as a 0.5-foot accuracy, it can be optimized to survey-quality accuracy such that it is useable in survey context.

An exemplary survey context is when a planner would need to know the location of telephone poles 118B or 118C. As will be explained in much greater detail below, in the past if a planner were offsite, located miles away from telephone poles 118B and 118C, he or she would not be able to readily determine information about those items, especially not with enough precision so as to rely on in a survey context. But by utilizing our technology, the planner will be able to select the geographic area of choice, which in this example would include telephone poles 118B and 118C, and receive a presentation of the physical characteristics and other traits associated with the telephone poles, thereby allowing him or her to make a planning decision in real time.

Figure 2:
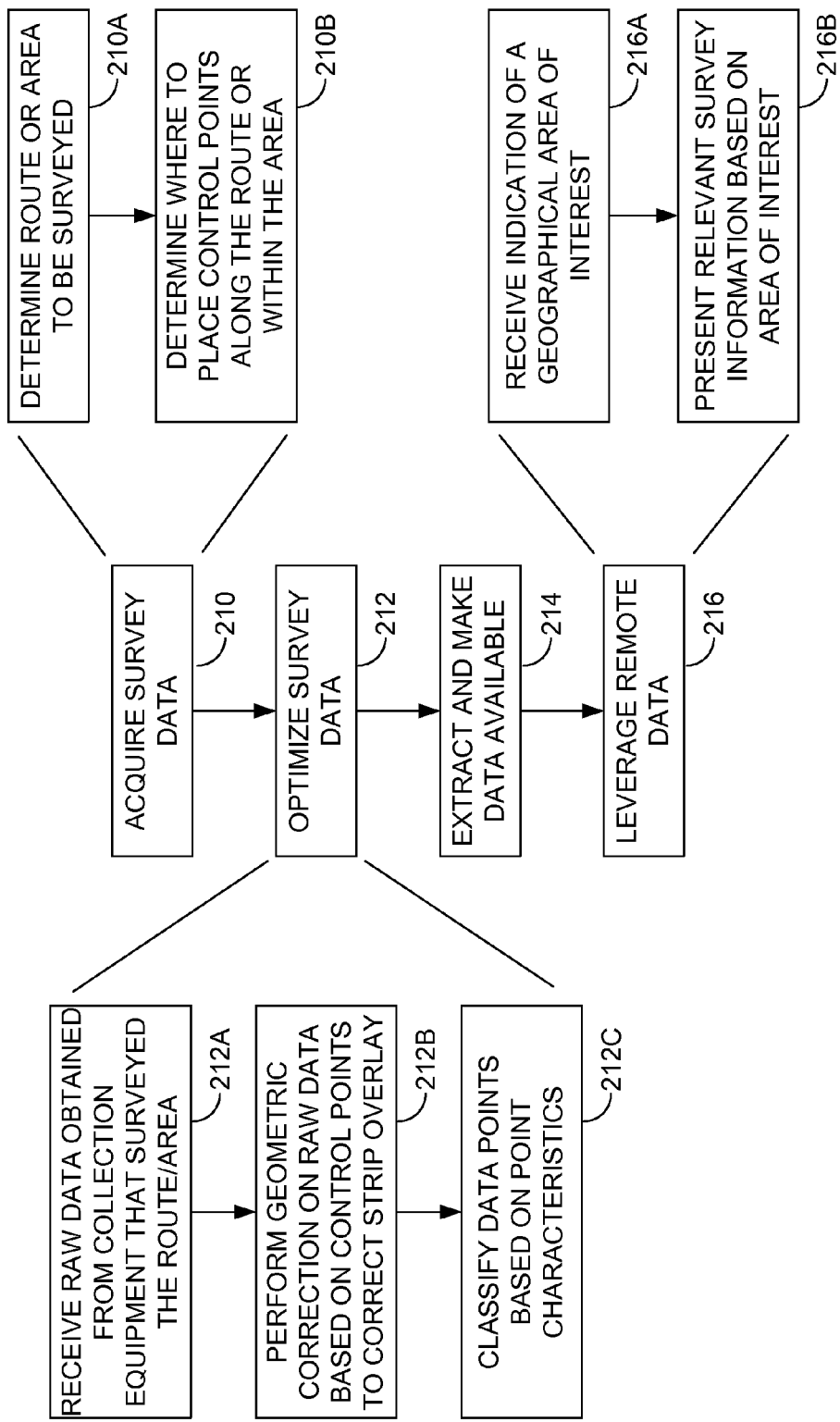
FIG. 2 depicts an illustrative overall process of making survey data available according to an embodiment of our technology.

An exemplary process according to an embodiment of our technology is depicted in FIG. 2. At step 210 survey data is acquired. We have briefly described aspects of acquiring survey data with reference to FIG. 1. At a step 210A, a route is determined to be surveyed in one embodiment. This route can be determined by a computing device so as to obtain optimal data-collection results. The MMS can generally be relied upon to accurately receive indications of objects within about 120 meters of the capture equipment. At a step 210B, a determination is made as to where to place control points along the route. We previously mentioned control points when discussing FIG. 1. As will be explained, these control points can be used to facilitate a geometric-correction process to ensure that strips of data accurately overlap with each other.

At a step 212, the survey data is optimized. In one embodiment, this includes receiving raw data that was obtained from a MMS, such as capture equipment 114 that surveyed the route, referenced by step 212A. The optimization process may include "noise" removal from the survey data. Exemplary noise features may include vehicles, pedestrians, reflections, and false "low" points. The raw data is able to be subjected to a geometric-correction process at a step 212B based on the control points in order to correct any misaligned strips. The geometric-correction may include projecting spatial data to a grid using the average combined scale factor defined by the survey control adjustment. Within the MMS collection a ±0.02 (feet) (at 1σ) relative horizontal and vertical accuracy may be specified to produce a final absolute horizontal and vertical accuracy of ±0.03 (feet) (at 1σ) after geometric corrections are made.

In one embodiment, the data that is collected and stored in the form of strips that amount to different discreet geographic areas. The strips are overlaying with each other so as to create a representation of a route. The control points (120-126) are used to ensure that the strips correctly overlay each other. Once the strips are accurately aligned, the LiDAR data can be tiled into manageable pieces. The LiDAR data may be saved in .LAS files. The .LAS files allow the following attributes to be specified: Northing, Easting, Elevation, Intensity, Flight Path (trajectory), Classification, Red, Blue, and Green. The tile grid may be detailed in a .DGN file, which is a CAD file format supported by Micro Station. The tile grid may include a plot of the route or trajectory used to generate the LiDAR data as well as specify how the .LAS files related to each other spatially. Other suitable file formats may be used.

Another aspect of data optimization includes classifying data points based on point characteristics at a step 212C. The classifying data points can include classifying the data points as representing ground, water, vegetation, and the like. Tools are run on the billions of points to find out information of interest. For example, one goal is to obtain ground truth. For example, even though grass might be six inches high, the attribute that is desired is likely the location and topographical features of the ground itself, which lie six inches below the grass. We are able to discern the difference between characteristics that define a blade of grass and thereby use that information to determine (if not directly identify) the topographical and other features of the actual ground.

At a step 214, the data is made available for remote use. In one embodiment, making the data available comprises uploading the data to a remote storage system and storing it in a spatially indexed data store. Once in the data store, the user may retrieve data describing areas of interest. This step will be explained in greater detail below.

At a step 216, the remote data is leveraged. To leverage the remote data contemplates benefitting from its collection and availability. One aspect of leveraging the data could be the fact that it is simply available for use. Another way that the data can be leveraged is actually interrogating information from the uploaded datasets. In one embodiment, a field person might be outfitted with a mobile device, laptop, etc., and define on a map an area of interest. Based on the area of interest, our technology would present survey information within that geographical area. Hence, as shown, at a step 216A a defined extract for a geographical area of interest is received. In one embodiment, the extract is received at servers (such as those in FIG. 3 which will be discussed next). The database that stores the information can be queried using the extract to obtain survey data that is presented to the requester at step 216B. In one embodiment, this information is sent back to the requesting device to enable it to present the survey data on its display or one coupled thereto. This information can be presented in a machine-readable format based on the requesting users needs.

Figure 3:
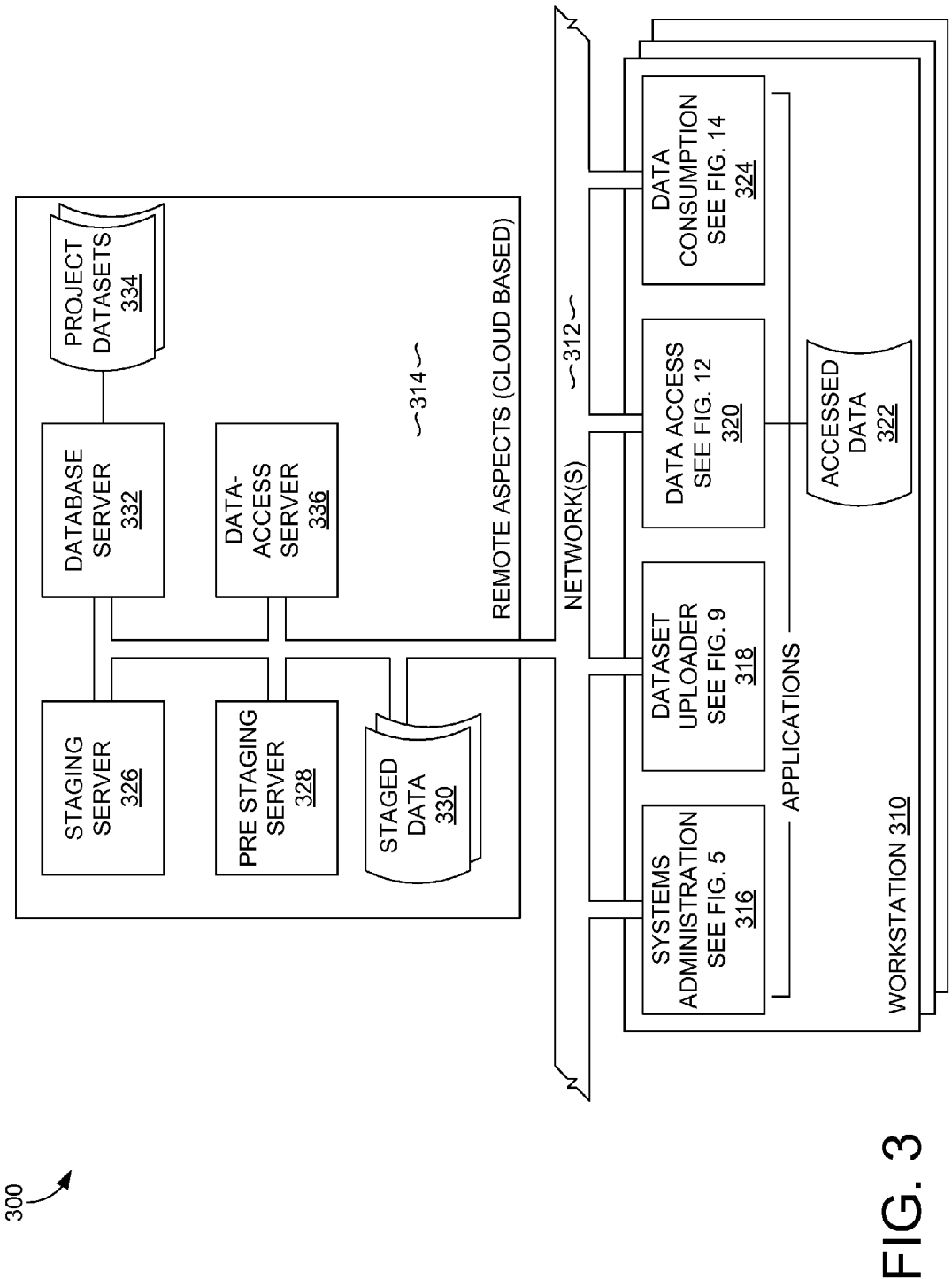
FIG. 3 depicts an illustrative operating environment that shows client-side and server-side details according to an embodiment of our technology.

Turning now to FIG. 3, an illustrative operating environment 300 is shown that depicts an exemplary architecture that is suitable for practicing an embodiment of the present invention. In general, it includes a workstation 310. As is the case throughout this document, our use of the singular is not meant to convey only singular items. Rather, such use generally contemplates the plural unless the context clearly dictates otherwise, in which it will usually be expressly stated. Normally, multiple workstations will be coupled to remote aspects, which might take on a cloud-based arrangement.

The workstations include a processor, input output components, display components, and storage options that store computer executable instructions on computer readable media. These instructions are used, in part or in some aspects, to carry out certain features of embodiments of our technology. In one embodiment, the workstations are coupled to remote components 314 by way of one or more networks 312. Exemplary networks include the Internet that work in concert with other public or private networks so as to facilitate an information flow from the remote components 314 to the local components that will generally be local to a user of the system. Four illustrative applications are depicted as being the types of applications that can be put into place by way of workstation 310.

Figure 5:
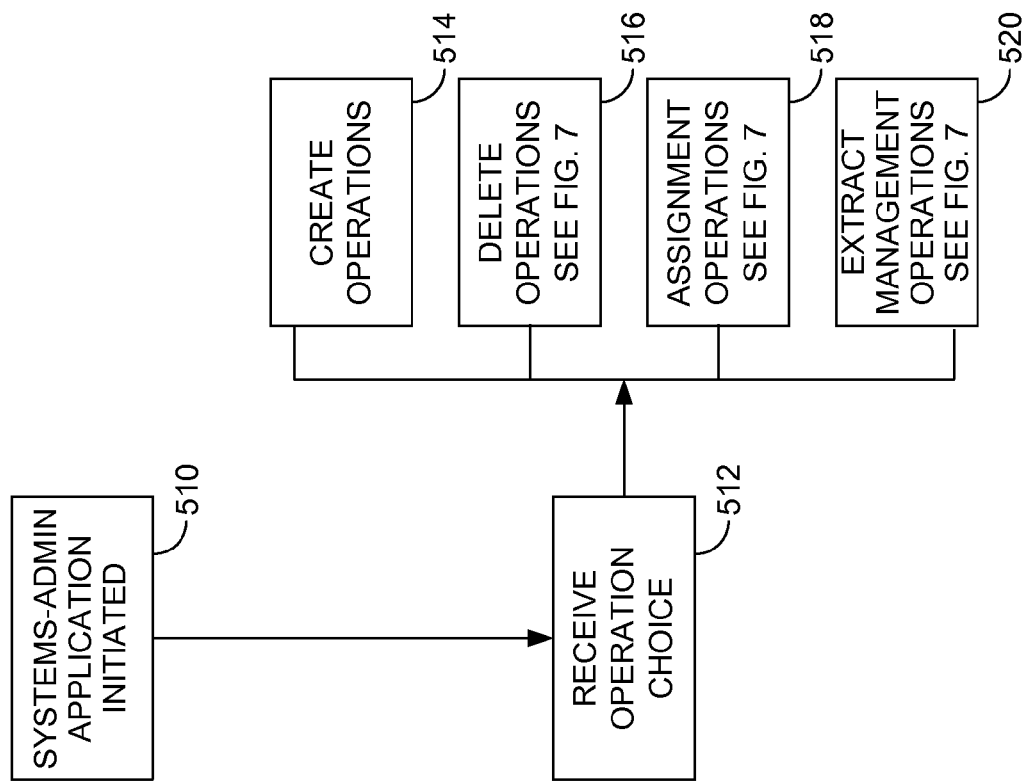
FIG. 5 depicts illustrative system-administration functions that are available according to an embodiment of our technology.

A first application includes a systems-administration application 316, about which more details will be provided in connection with FIG. 5. A second illustrative application includes a dataset uploader 318. The dataset uploader is a component that will facilitate the communication and management of the vast amounts of data to be generated in connection with surveying a route such as road 110. In some embodiments, the point-cloud data that can be generated will be on the order of tens of gigabytes. Managing this amount of data has historically been difficult. Dataset uploader 318 works in concert with the other components shown so as to facilitate a communication of the data to the remote components 314, thereby making the data available to be leveraged by a different sort of user of the system, such as a field user who desires to obtain survey data.

A data-access component 320 is also depicted as being an application that can be run alone or in combination with the other applications on workstation 310. Additional aspects of the data-access component 320 will be described in connection with FIG. 12. The data-access component is one that helps facilitate the management of accessed data 322. This is the data that was acquired as a result of the data-access process, such as the one referenced by numeral 1210 in FIG. 12.

A data-consumption application is referenced by numeral 324. Additional details of the data-consumption component will be provided in connection with FIG. 15. The data-consumption component 324 allows for consumption of vast amounts of data in a way that enables it to be utilized by other components of the system.

As mentioned, the workstation components can be coupled by way of network 312 to server-side components, some of which are depicted in FIG. 3. By way of example, a staging server 326 is shown as well as a pre-staging server 328, a database server 332, and a data-access server 336. Servers 326 and 328 operate on staged data 330. Data access server 336 operates on data 334 which is served by database server 332. The staged data 330 includes data collection sets that have been uploaded from the client-side components via the pre-staging server 328. There might be multiple sets of staged data. We illustratively show on FIG. 3 that the staged data might take the form of multiple collection sets, but again, do not need to implicate that other devices are only in the singular because they are not shown in a similar manner. We attempt to show some components in the plural for context to help readability but not to constrain or limit implementation aspects of our technology. By way of example, there might be multiple staging servers or database servers for example.

Staged data 330 is able to be processed by a staging server 326, which prepares data for use by the database server 332. The servers also include a processor, memory, input/output mechanisms, etc., so as to enable the processing of computer-executable instructions that enable features of our technology to be carried out.

A database server 332 stores project datasets 334. The project datasets 334 might variously be referred to herein as collections, collects, or collection datasets. In one embodiment, these datasets 334 include the data that is retrievable by a user who wishes to obtain survey data associated with a defined geographic area. A database server 332 (upon which the product datasets can be stored in some embodiments, helps facilitate communication and management of the project datasets 334 in some embodiments).

A pre-staging server 328 helps carry out a data-acquisition process that receives data from the workstations so as to enable it to be processed by the staging server(s) and/or database server 332.

Figure 4:
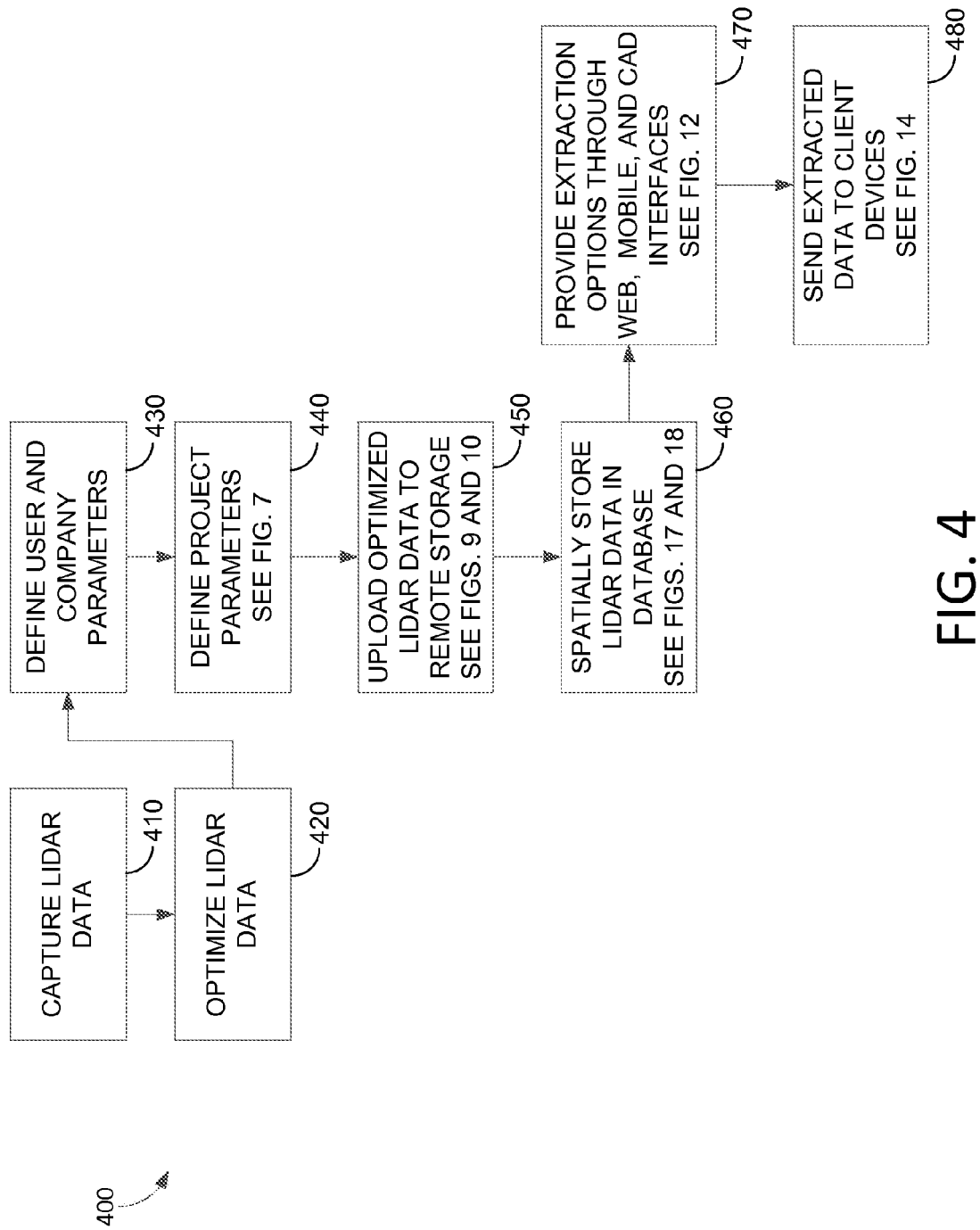
FIG. 4 depicts an illustrative method of managing survey data according to an embodiment of our technology.

Turning now to FIG. 4, a method 400 of managing LiDAR data is shown, in accordance with an embodiment of the present invention. At step 1410, LiDAR data is captured. One method of capturing LiDAR data has been described previously with reference to FIG. 1.

At step 420, the LiDAR data is optimized. The optimization of LiDAR data may include geometric correction and noise reduction as described previously with reference to FIG. 2.

At step 430, various entities and relationships between the entities may be defined. For example, a user may be defined along with companies and company parameters. Setting up companies, users, and company parameters will be described in more detail subsequently with reference to FIG. 6. At step 440, project parameters are defined. Project parameters and a process for defining project parameters are described in more detail with reference to FIG. 7.

At step 450, optimized LiDAR data is uploaded to remote storage. An exemplary uploading process is described in more detail with reference to FIGS. 9 and 10.

Figure 17:
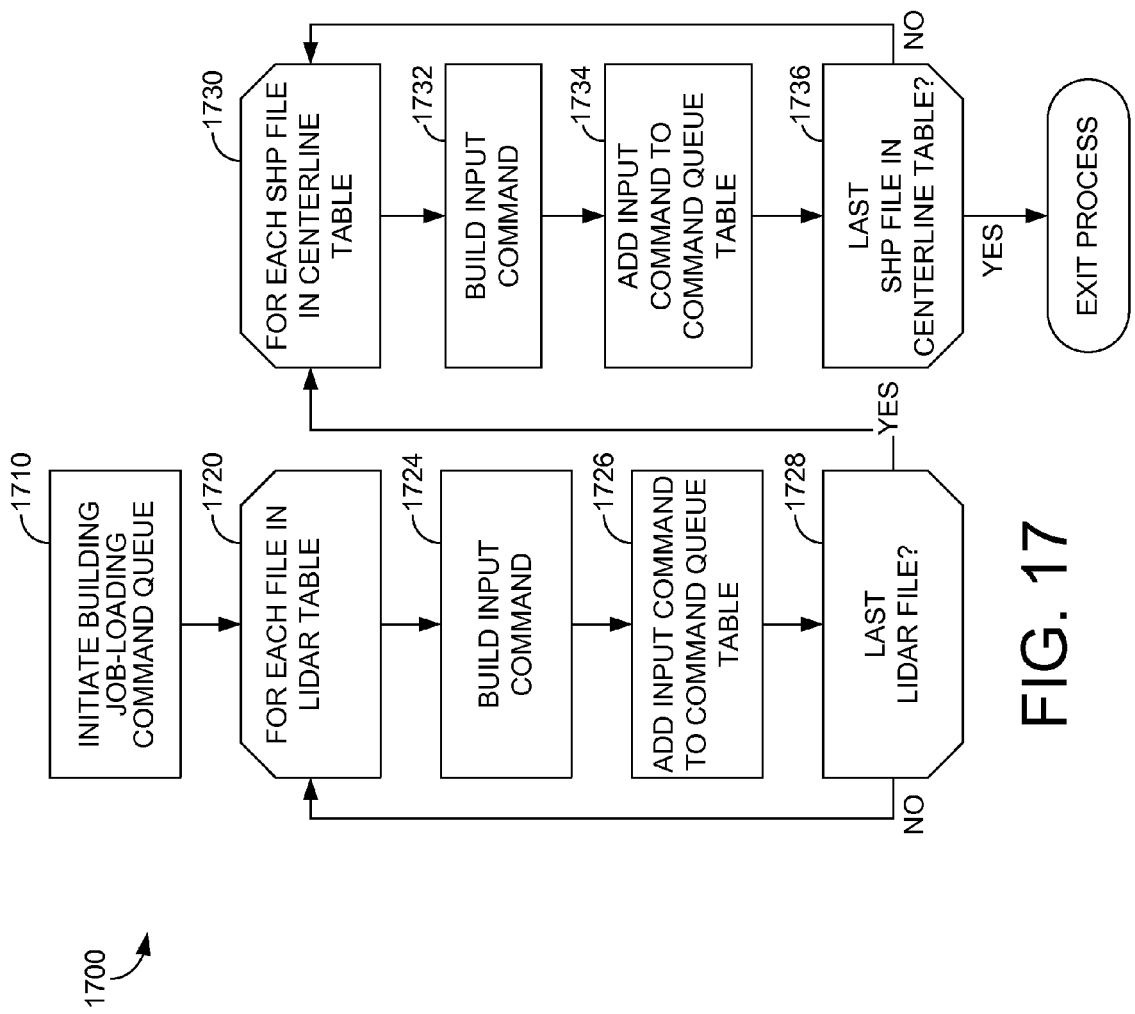
FIG. 17 depicts an exemplary process for storing point-cloud data in a spatial database according to an embodiment of our technology.
Figure 18:
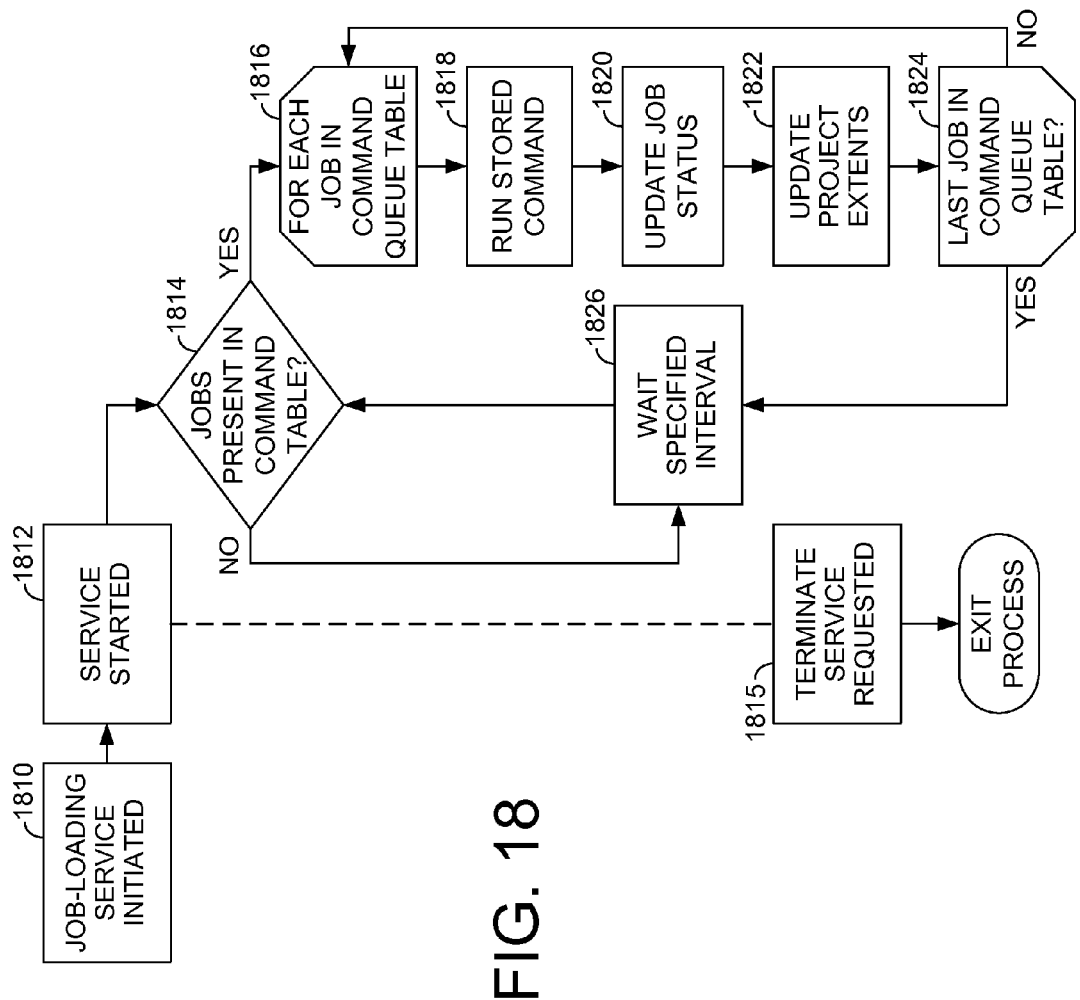
FIG. 18 depicts further details of an exemplary process for storing point-cloud data in a spatial database according to an embodiment of our technology.

At step 460, LiDAR data is spatially stored in a database. FIGS. 17 and 18 describe an exemplary storage process in more detail.

At step 470, extraction options are provided through web, mobile, and CAD interfaces. An exemplary extraction process is explained in more detail with reference to FIG. 12. In addition, FIGS. 19, 20, 21, and 22 provide exemplary user interfaces showing different extraction options.

At step 480, extracted data is sent to client devices. The extracted data then may be consumed by a display application operating on the client devices. An exemplary extraction process is described in more detail with reference to FIG. 14.

Turning now to FIG. 5, an illustrative representation of systems-administration functions is provided. At a step 510, a systems-administration application can be initiated. The systems-administration application allows a user to perform various administrative functions. Initially a user may wish to select a particular administrative task to complete. At step 512, the application receives an administrative operation of choice. For example, a user might indicate a desire to manipulate creation options at a step 514, perform delete operations at a step 516, manipulate assignment operations at a step 518, or perform management operations associated with extraction at a step 520. Exemplary delete operations will be described in greater detail in connection with FIG. 7. Exemplary assignment operations will be described in greater detail in connection with FIG. 7, which is referenced by numeral 518. Another option available to a system's administrator or other user is to manage extraction options at a step 520. Exemplary extract-management operations will be described in greater detail in connection with FIG. 7.

Figure 6:
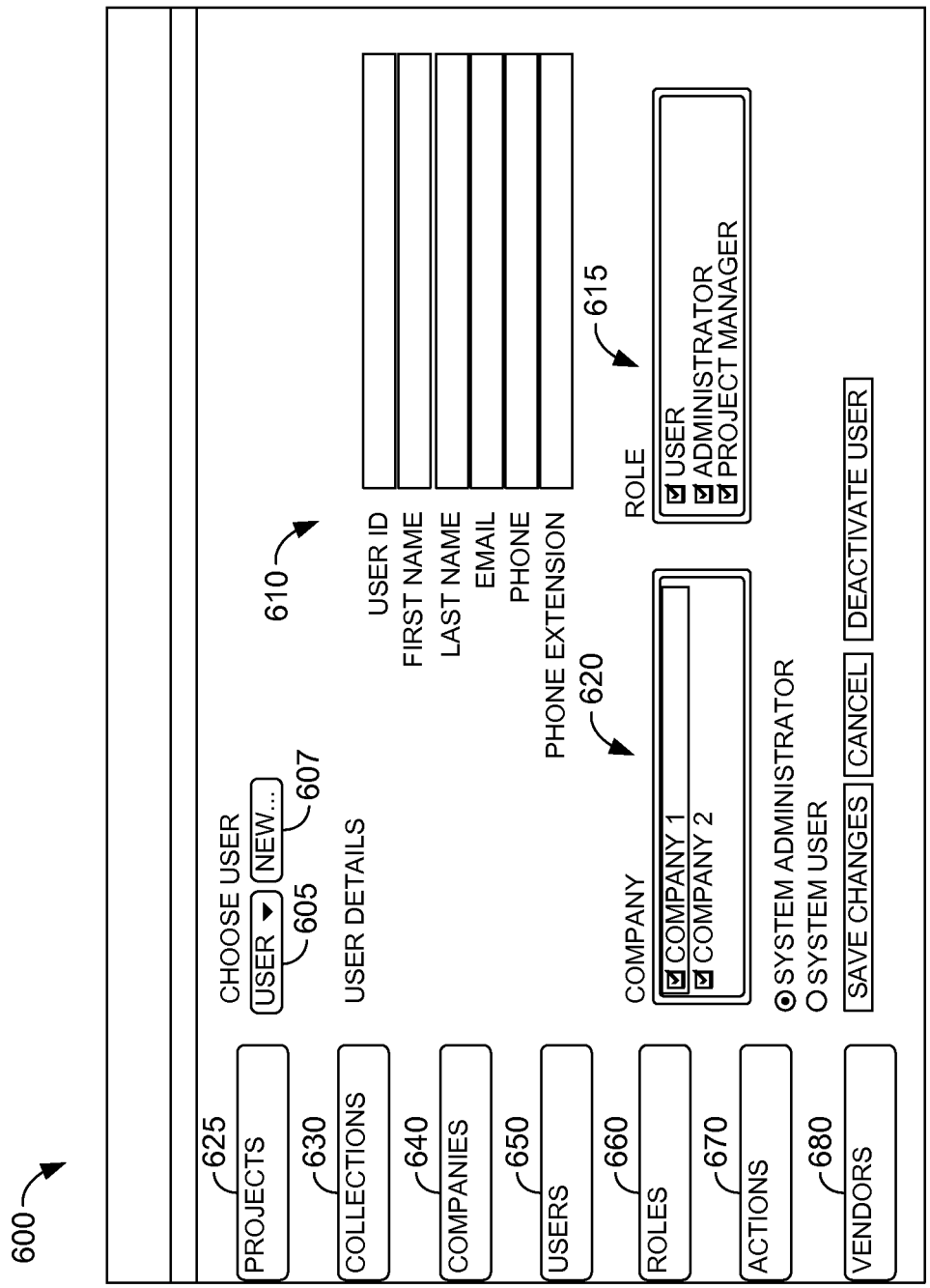
FIG. 6 depicts a user interface through which administrative functions are performed according to an embodiment of our technology.

Turning now to FIG. 6, an administration interface 600 is shown, in accordance with an embodiment of the present invention. The administration interface allows users to complete several administrative tasks. These administrative tasks help control access to the data, for example, by allowing different types of data access.

On the left side of the administrative interface 600 a user may select one of several function buttons to access views associated with performing the related functions. The function buttons include project button 625, collection button 630, company button 640, user button 650, role button 660, action button 670, and vendor button 680. The users' page is the active view in administration interface 600 shown in FIG. 6. The active page or view changes as different views/functions are selected.

The user view allows user characteristics to be edited. A new user may be added by clicking the new user button 607. In the user information interface 610, a user ID may be selected and the first name, last name, and contact information for a user may be entered. In role interface 615, a role may be assigned to a user. Roles include user administrator and project manager. Each role may be associated with different kinds of access to data and permission to perform various functions in the system. Roles may be defined through the role view, which can be accessed by pressing role button 660. Roles allow access profiles to be created for individual users by assigning them to one or more roles. Roles alleviate the need to set up individual access parameters for each individual user, although that method is also possible.

The company interface 620 allows a user to be associated with one or more companies. Associating a user with a company may allow the user access to collections or projects associated with that company. Associating a user with a company eliminates the need to associate a user with individual projects or collections associated with that company. Again, in an alternative embodiment, a user could be assigned access at any level of desired granularity including to individual projects without reference to a company.

In addition to creating new users, the permissions and profile information associated with existing users may be changed by selecting the user 605 button.

The projects button 625 allows the project view to be accessed. In the project view, projects may be accessed, created, and modified. Projects organize survey data according to a real-world project. Projects may be associated with companies and/or users. In one embodiment, a user associated with a company may access all projects associated with that company. A project may consist of one or more collections of survey data.

The collections may be accessed and defined through a view accessed via collection button 630. A user may be assigned permission to access collections on a per collection basis or may access all collections assigned to a project to which the user is assigned or a company to which the project or user is assigned.

Roles may be created or updated through a role view accessed by the role button 660. A role may be considered a generic user profile. A user assigned a role may be given all the privileges associated with the role. A user may be associated with one or more roles.

Actions may be added or created through an actions view accessed through action button 670. Actions include various administrative tasks such as adding data to the system, deleting data to the system, modifying data, and other tasks. Users may be given permission to perform individual actions or actions may be associated with one or more roles.

Vendor information may be updated through a vendor interface, which is accessed through vendor button 680. Vendors may be given access to certain companies' data or certain projects on which they work. Vendor's permissions may be set up in a manner similar to the user's permissions.

Figure 7:
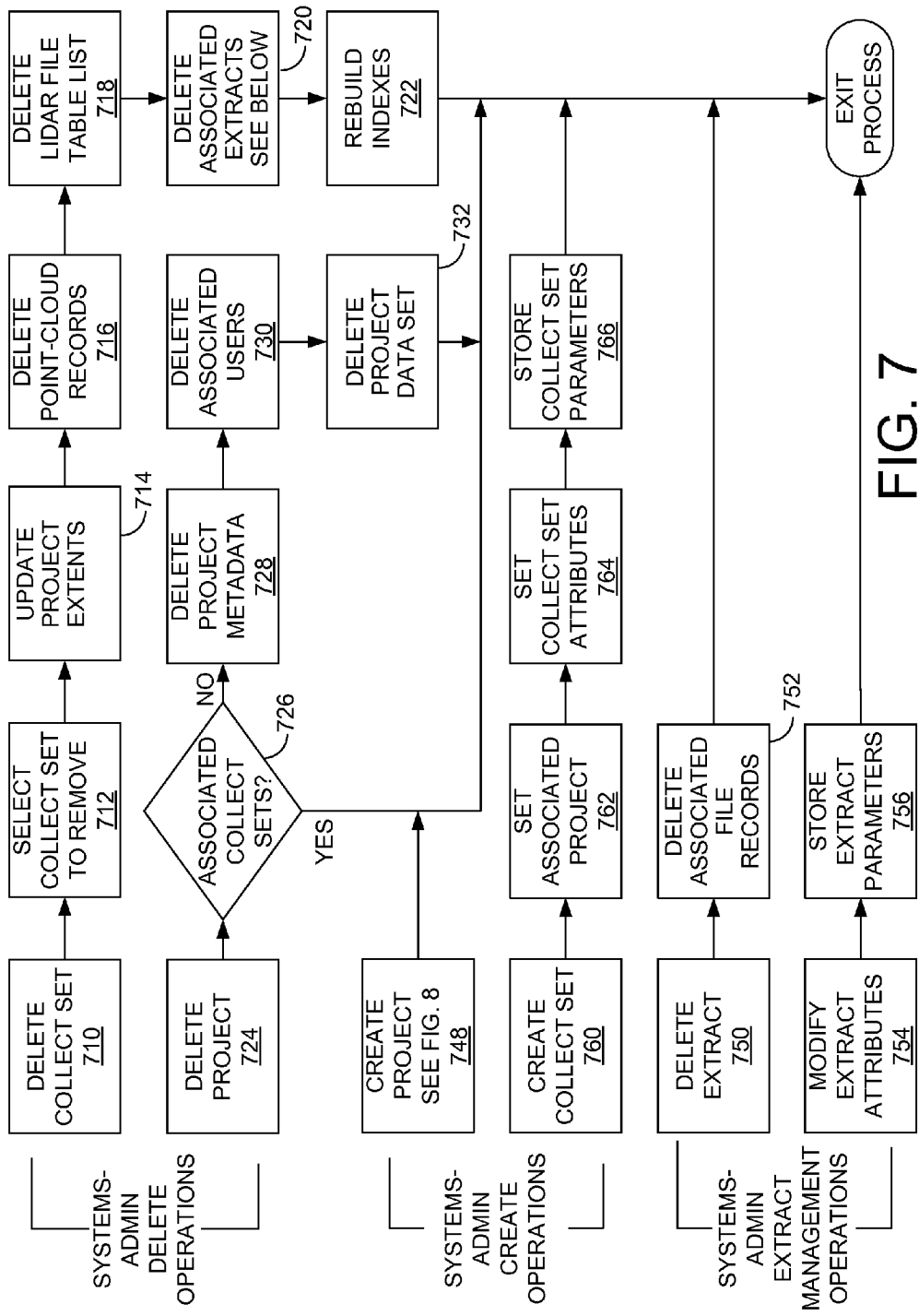
FIG. 7 depicts illustrative delete, create, and extract options associated with embodiments of our technology.

Turning now to FIG. 7, exemplary administrative operations are shown. Beginning first with explaining aspects of delete operations, a process associated with deleting a collection set is illustratively shown to begin at a step 710. A collect set is a group of point-cloud data describing features within a tile, such as tile 1930 shown on FIG. 19. The collect set may initially be gathered during a single LiDAR survey. As described previously, a single survey may comprise multiple traversals of a route. In an embodiment, a single survey may generate multiple collect sets. A collect set may be a sub group of point-cloud data within a project.

The system can receive an indication of a collection set that is to be removed at a step 712. If this results in a project's geographic extents needing to be updated, then the same can occur at a step 714. A project's extents are the boundaries of a geographic area described by the survey data. As collect sets are added and removed to a project, the project's extents may or may not change. For example, when the collect set being removed completely overlaps with another collect set, then the project extents would not change. On the other hand, if a collect set that is the only collect set in the project that describes a particular area is removed then the project extents would be reduced.

The point-cloud records are deleted at step 716 in one embodiment of our technology. The point-cloud records associated with the collect set are deleted from a data store in which they are spatially stored. This memory may then be repurposed.

If a LiDAR file table list persists, then it is deleted at a step 718. The LiDAR file table list may describe the files that comprise a collect set. A single collect set may comprise multiple files of point-cloud data. Any associated extracts are also deleted at a step 720. Extracts are queries of project areas that allow a user to retrieve point-cloud data for a certain area. The user may direct the extract to one or more collect sets. At step 720, extracts that specify the deleted collect set are deleted, since they are now inoperable. The indices that previously accounted for the collection set that was deleted are rebuilt at a step 722 so that the indices no longer indicate an availability of the data set that was deleted. In one embodiment, the process can be exited at this time.

If a project was to be deleted at a step 724, then a determination is made as to whether any associated collection sets exist 726. If they do exist, the process ends in one embodiment, but if not, any metadata associated with a project is deleted at a step 728, as well as users associated with the project at a step 730. At a step 732, the project's data sets are deleted.

A method for deleting extractions is also depicted in FIG. 7. As stated, an extract defines the parameters of an acquisition request or query. Once created, the extract may be stored for latter use. For example, an engineer may create an extract to retrieve point-cloud data for an area near a particular bridge. Instead of recreating the extract each time the engineer wants to view the point-cloud data, the extract may be saved. When the extract is no longer useful it may be deleted. Deleting the extract does not delete the underlying point-cloud data retrieved by the extract. An indication as to whether an extraction should be deleted can be received at a step 750. The extract could be identified by name or selected through an interface. At step 752, the extract file records, which are the records that store the extract properties, are deleted. If extract attributes are only to be modified, such as at a step 754, then this can be accomplished by way of storing new extract parameters at a step 756.

A collection set (or collect set for short) can be created starting with a step 760. In one embodiment, information describing the collect set may be provided by a user. For example, the user could name the collect set. In another embodiment, the collect set is named sequentially based on a specified naming convention. A given project can be associated with the collect set at step 762. As mentioned, collect sets may be thought of as a sub set of the point-cloud data within a project. Though with small projects, a single project may have a single collect set. Collection-set attributes can be received at a step 764. Different attributes associated with the collection set might include the type of survey data, the date the collect set was generated, a collect set name, and other characteristics. In one embodiment, these characteristics are defined by parameters that are received and stored at a step 766.

Figure 8:
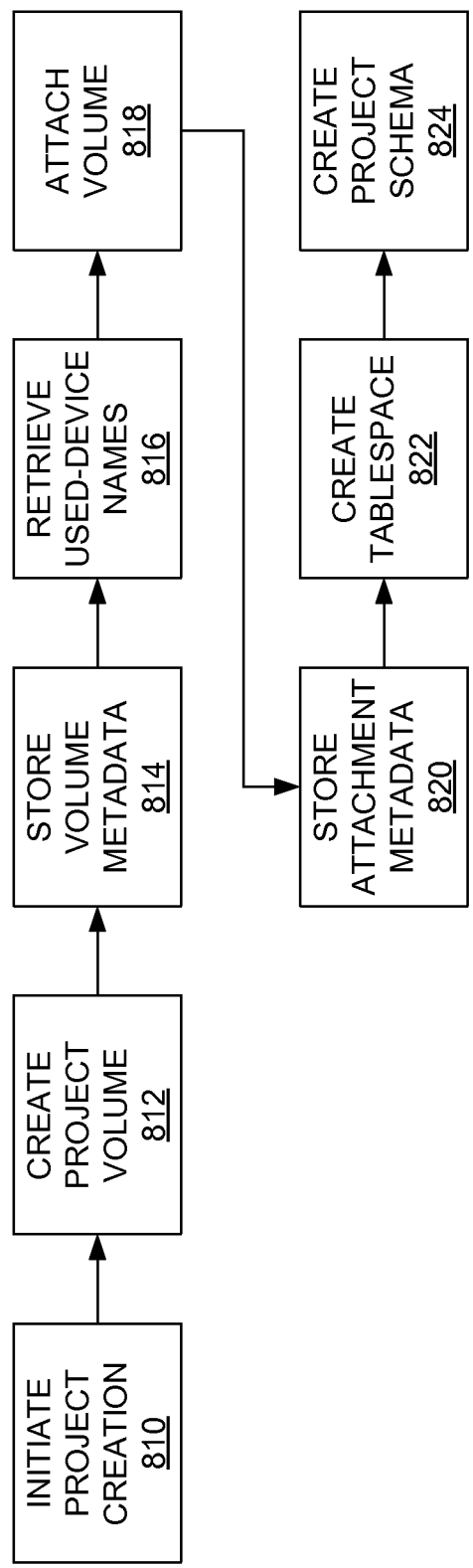
FIG. 8 depicts an exemplary project-creation process according to an embodiment of our technology.

Turning now to FIG. 8, an illustrative embodiment of creating a project is provided. In one embodiment, this includes beginning a project-creation process at a step 810 by assigning a name to the project, as well as other metadata. The user may enter the size of the data volume to be created. This size is based on the amount of point-cloud data that will be loaded into the project. The size may be stored as project metadata. Step 810 may be accomplished through an administration feature described previously.

The process further includes creating a project volume at a step 812. The size of the volume is set to the size entered by the user previously. Once the volume is successfully created, its ID is stored in a database along with all other volume metadata (step 814). The project volume reserves an appropriate amount of computer-accessible storage on a remote storage system. Creating a project volume enables the data that is ultimately associated with a project to be associated with the volume when stored.

After the volume is created, the next step is to attach the volume to the database server. At step 816, available device names to which the volume may be attached are retrieved. When attaching the volume to the server, the volume may be assigned a unique device name. In one embodiment, an algorithm is used to check the existing device names and to assign the next sequential unused device name to the volume. Once the volume is successfully attached to the server at step 818, its attachment metadata is stored in the database at step 820. The volume, which may actually comprise multiple physical storage devices, is now recognized as a single device by the server. Further, the volume is associated with the project.

Now that the device is available to be used for storage on the server, the next step is to allocate the device storage to the database. At a step 822, a logical storage unit known as a tablespace is created on the database, and it uses the virtual device as its data file. This tablespace can now hold all of the point-cloud data and metadata for a project.

A project schema is created at a step 824. The project data model is then created in the project schema. This schema is designed to hold point-cloud collections and user extract metadata. In one embodiment, a project schema lays out a hierarchy and/or relationship that exists between different data items that will be stored in the database. In one embodiment, steps 812 through 824 are preformed by remote components automatically without further user intervention.

Figure 9:
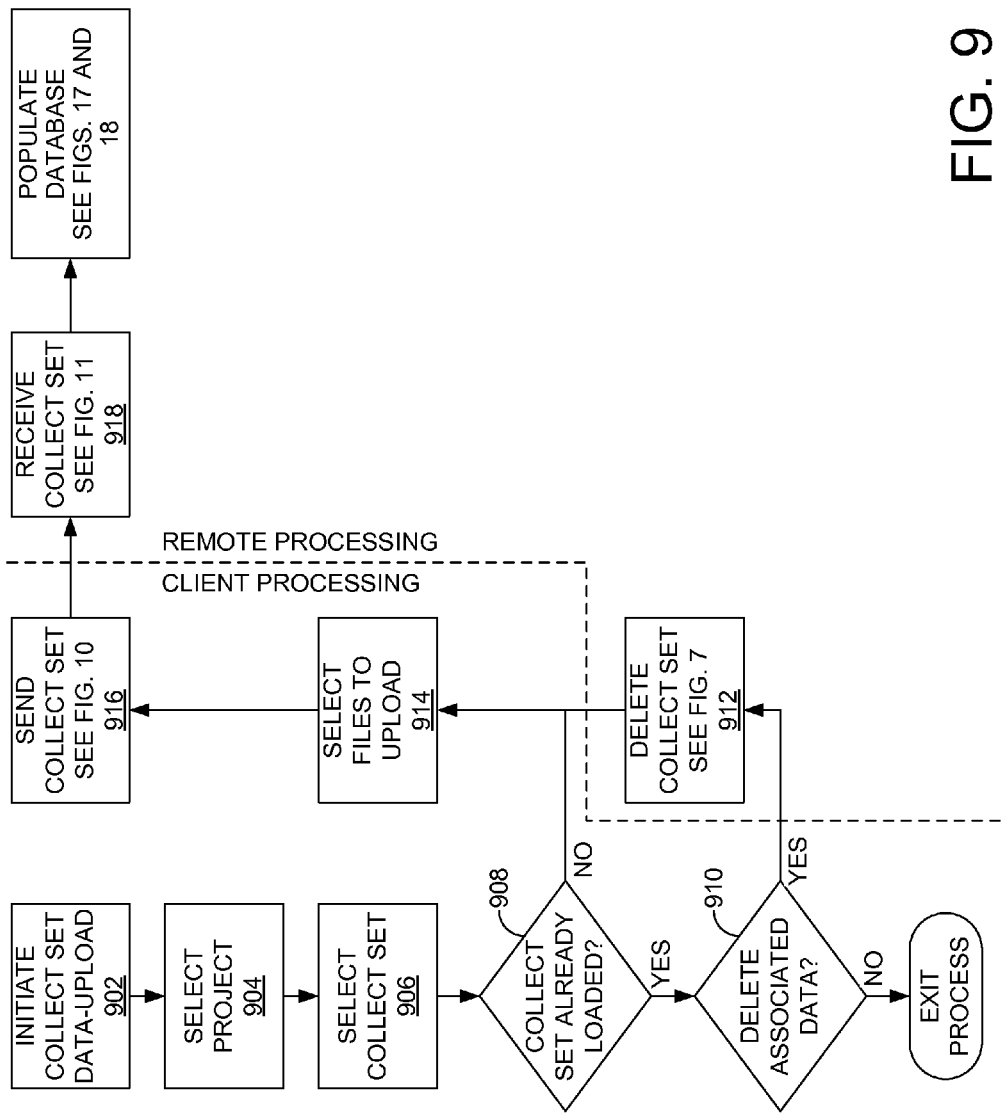
FIG. 9 depicts an illustrative data-upload process according to an embodiment of our technology.

Turning now to FIG. 9, exemplary aspects of uploading a collection data set are provided. At a step 902, a collection-set data-upload process is initiated. In one embodiment, the system receives a selection that indicates a desired project at a step 904. Similarly, a collection-set indication is received at a step 906. At a step 908, a determination is made as to whether the collection set is already loaded. If so, another determination at a step 910 is made as to whether any data associated with a collection set should be deleted. If not, the process can end in one embodiment, but if so, the collection set is deleted at a step 912, which was described in greater detail in connection with FIG. 7.

Returning to step 908, if the collection set was not already loaded, then an indication as to which files should be uploaded as part of the collect set is received at a step 914. Based on the indications received, the collection set is sent to a remote-processing component, such as that shown in FIG. 3. This process step 916 is described in greater detail in connection with FIG. 10.

From the server-side point of view, the collection set is received at a step 918 and populated into a database. The process of receiving the collect set is described in FIG. 11. The process of storing the collect set in the database is described in FIGS. 17 and 18.

Figure 10:
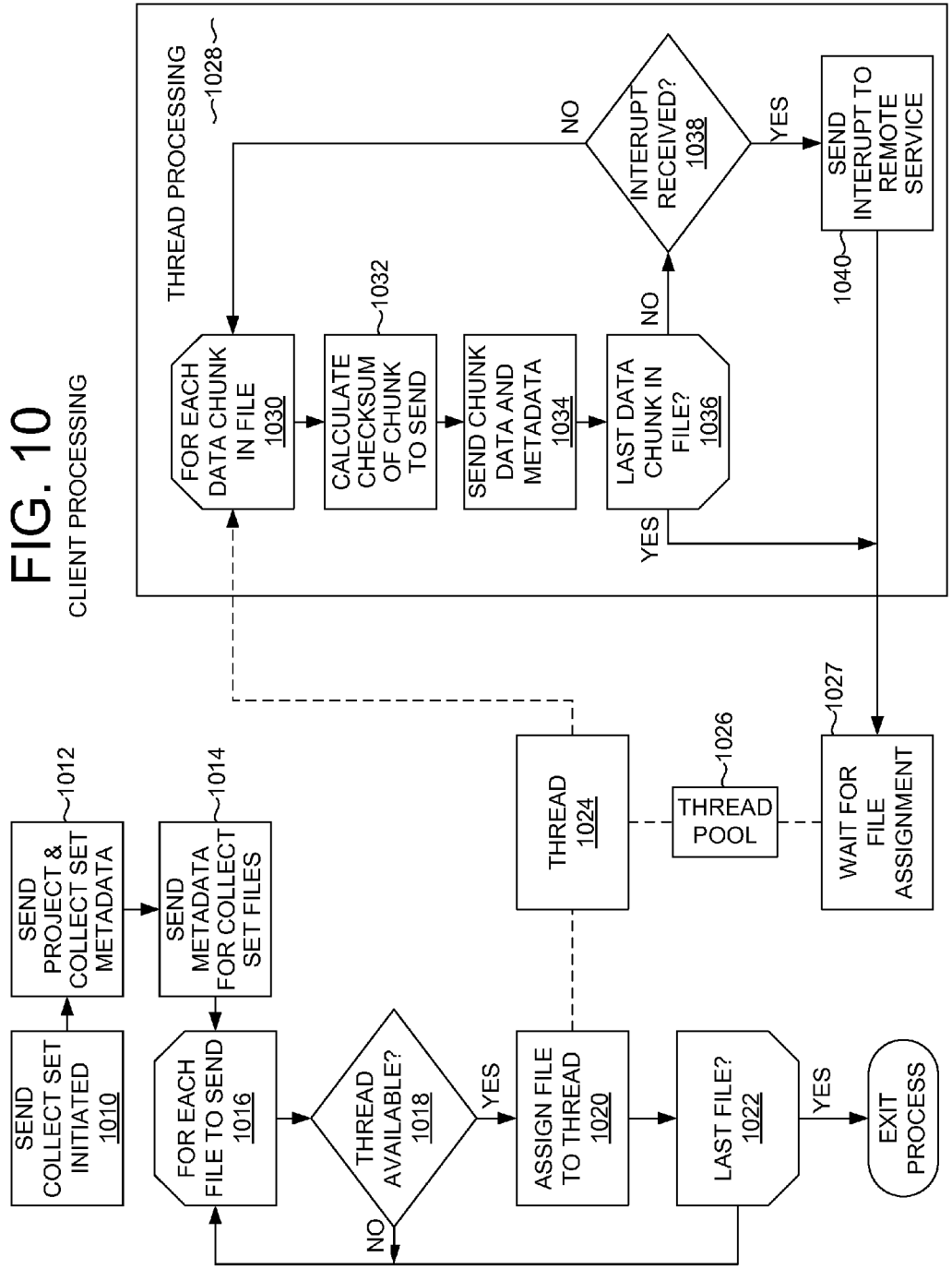
FIG. 10 depicts additional client-processing details associated with aspects of an upload process according to an embodiment of our technology.

Turning now to FIG. 10, additional detail regarding aspects of client-side processing are provided. In one embodiment, this client-side processing includes processing that would take place on the one or more workstations 310 that were described in FIG. 3. With reference to both FIG. 3 and FIG. 10, a command initiating the sending of a collection set is received at a step 1010.

At a step 1012, project and collection-set metadata are sent. Moreover, any metadata associated with a group of collect set files is also sent at a step 1014. In one embodiment, a loop begins at a step 1016 that will include a series of steps that can be carried out for each file that is to be sent. An inquiry is made as to whether a thread is available for processing at a step 1018. This determination is based on the availability of threads in the thread pool, indicated by reference numeral 1026, waiting for file assignment at step 1027. If no threads are available, processing reverts to step 1016, or waits until a thread is available. If a thread is available, then a next available thread is assigned to a given file at a step 1020. A determination is made at a step 1022 as to whether the last file has been processed. If not, then processing reverts to step 1016. If so, then processing can end in one embodiment.

Returning to step 1020, if a file was assigned to a thread at a step 1020, then the thread(s) process begins to run at what is indicated by reference numeral 1024.

After a file is assigned to a thread at step 1024, a thread-processing routine is initiated at step 1028. In one embodiment, a loop begins at a step 1030 that initiates a process that will be carried out for each data chunk in a file. Recall that large files are deliberately separated into chunks based on the steps and constraints described in this disclosure. At a step 1032, a file-integrity attribute is derived from the chunk so as to ultimately be able to determine whether the chunk was properly communicated from a first location to a second location (such as from a workstation or similar to remote components 314).

In one embodiment, the data-integrity value takes the form of a checksum. Thus, in one embodiment, the checksum associated with a chunk is calculated at a step 1032. The chunk of data as well as the metadata, which could include the checksum, is sent at a step 1034. At a step 1036 a determination is made as to whether the last chunk that would have made up the file being processed, has been operated on. If not, then processing advances to a step 1038 in one embodiment whereby a determination is made as to whether an interrupt has been received. If not, then processing reverts to step 1030 to process additional chunks. If so, then an interrupt is sent at a step 1040 to the remote service whereby a process of waiting for a file assignment begins at a step 1027.

Figure 11:
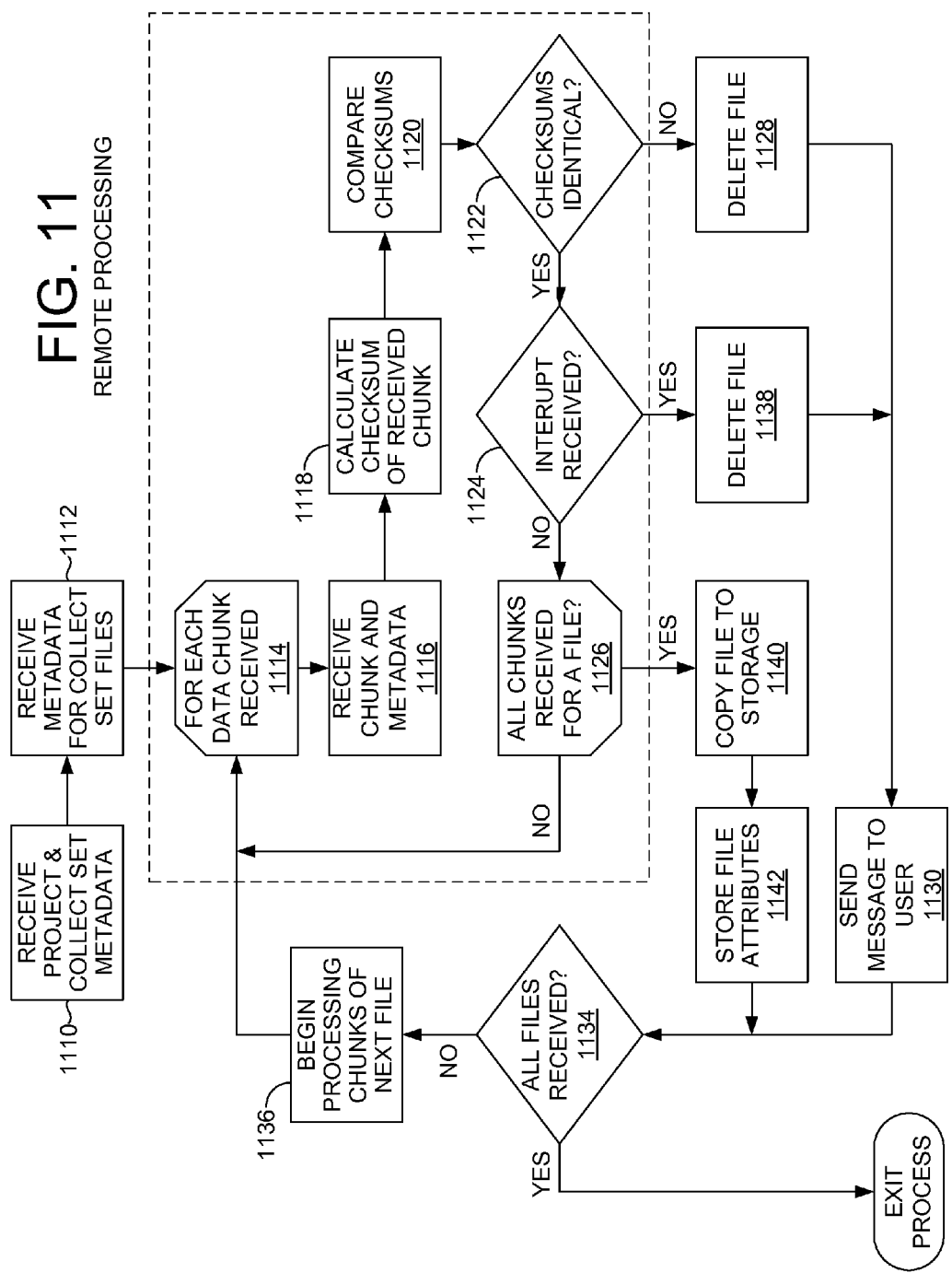
FIG. 11 depicts additional information associated with remote-processing aspects of an upload method according to an embodiment of our technology.

Turning now to FIG. 11, additional aspects associated with remote-processing features of our technology are provided. These features would be the types of features carried out by remote components 314, which are depicted in FIG. 3. With reference to both FIG. 3 and FIG. 11, a given project as well as collection-set metadata is received at a step 1110. At a step 1112, metadata for a group of collection-set files is also received. In other words, collect-set files for a given project are received.

A loop process according to one embodiment of our technology begins at a step 1114 that will be carried out for each chunk of data that is received. At a step 1116, the chunk data as well as any corresponding metadata is received. A data-integrity value is calculated at step 1118 for the chunk of data that was received. In one embodiment, the data-integrity value of the calculation step 1118 is a checksum value. This enables a comparison at a step 1120 of the checksum calculated at a step 1118 with the checksum that was calculated at step 1032 of FIG. 10. If the checksums are identical (step 1122) then processing continues to a step 1124, whereby a determination is made as to whether an interrupt has been received. If not then a check is made as to whether all of the chunks have been received for a given file at a step 1126. If all of the chunks for a given file have not yet been received, then processing reverts to the beginning of the loop; namely, step 1114 in one embodiment.

Returning to step 1122, if the checksums did not match, then the file is deleted at a step 1128. A message is sent to the user's device at a step 1130. Returning to step 1124, if an interrupt had been received, then the file is deleted at a step 1138, and the message is sent to the user's device at a step 1130. The message may request retransmission of the data chunk.

Returning to step 1126, if all of the chunks for a given file had been received, then the file is copied to a storage device at a step 1140. Moreover, file attributes are also stored at a step 1142. In one embodiment, the storage aspects just described take the form of storing the data by way of database server 332, such that the information stored takes the form of project datasets 334. At a step 1134, an inquiry is made as to whether all of the files that make up a collection set have been received. If so, the process ends in one embodiment; but if not, then processing reverts to step 1136.

Figure 12:
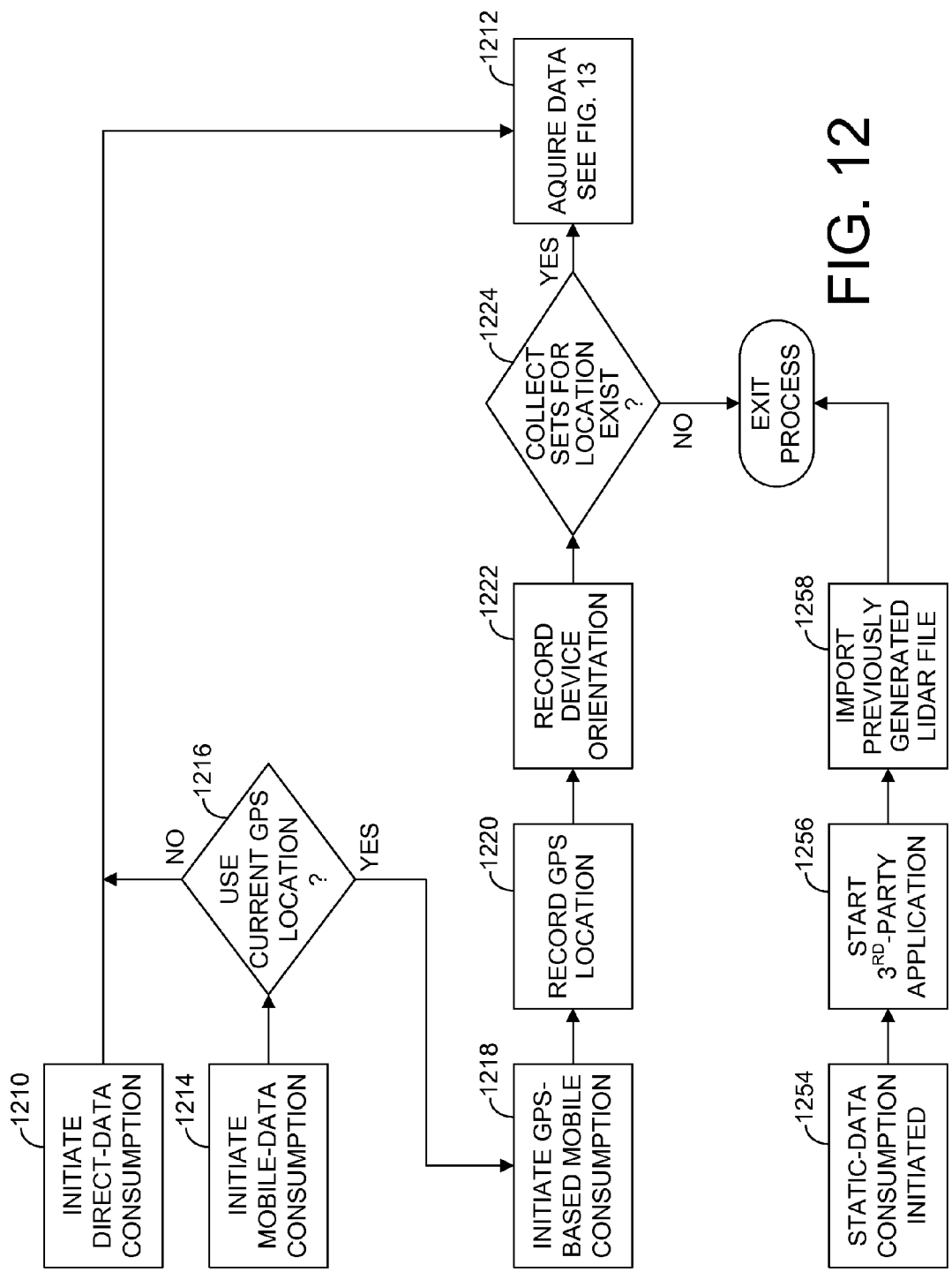
FIG. 12 depicts three illustrative data-access processes according to embodiments of our technology.

Turning now to FIG. 12, three different data-access processes are shown according to embodiments of our technology. The first process is a direct-data consumption process. The direct-data consumption process creates a point-cloud based on extract parameters provided and sends the point-cloud to the requesting device. The direct-data consumption is initiated at step 1210. The directed-data consumption then moves on to acquiring data at step 1212. Acquiring data is explained in more detail in FIG. 13.

At step 1214, a mobile-data consumption process is initiated. The mobile-data consumption process allows a mobile device to download point-cloud data from remote storage. The mobile data may be streamed to the mobile device or sent as a point cloud file. Other methods of transferring the survey data to the mobile device are possible. At step 1216 a determination is made as to whether GPS data will be used to specify an extract location. If no, then the data consumption process may continue as a direct-data consumption process. If GPS data is not used, then the next step is to acquire data at step 1212.

If yes at step 1216, then current GPS location data is used to define, in part, the extract boundaries. The GPS-based mobile consumption may be initiated at step 1218. At step 1220, the GPS location is recorded. The GPS location of the mobile device may be determined using GPS applications running on the mobile device. The GPS application may be queried and the GPS location retrieved.

At step 1222, the device orientation is recorded. In one embodiment, the device orientation is later used to define the boundaries of an extract. For example, the device could be pointed in a particular direction across a route and a cross-section style extract boundary could be created from the current GPS location across the route line created from the GPS location in the direction the device is pointing.

At step 1224, a determination is made whether collect sets exist for the current location. If a collect set does not exist for the current location then an extract cannot be generated for the current location since there is no data to draw from. If no collect sets exist for the current location, then the process will exit. On the other hand, if collect sets exist for the current location, then the process moves on to step 1212 where data is acquired.

The third-data consumption process is static-data consumption. The static-data consumption process may be initiated at step 1254. The static-data consumption uses a remote application to generate an image that is then downloaded to the requesting device. At step 1256, a third-party application is initiated. The third-party application generates an image using a specified LiDAR file. At step 1258, the previously generated LiDAR file is imported into the third-party application. A third-party application may then display or generate an image to be displayed on the requesting device.

Figure 13:
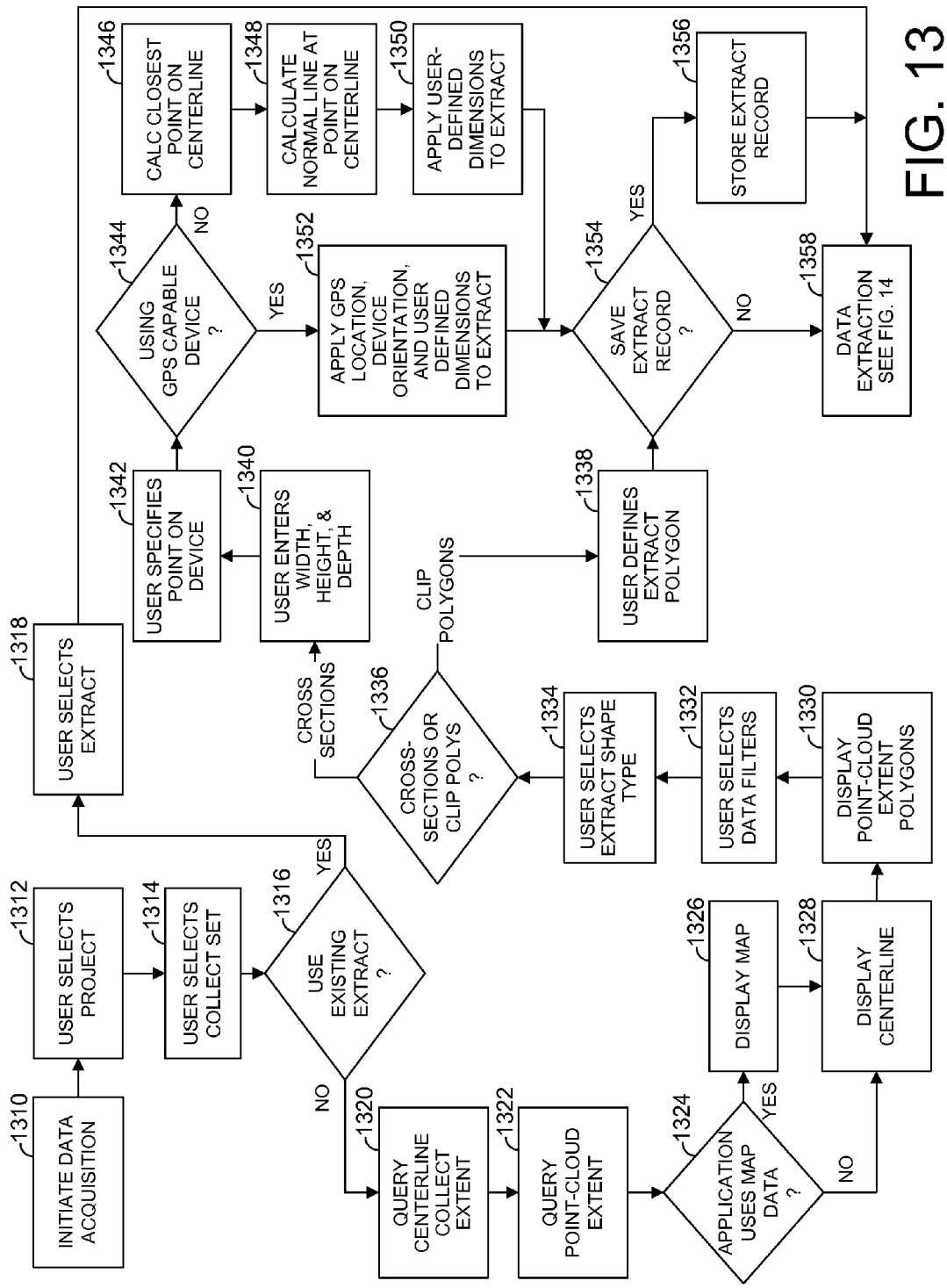
FIG. 13 depicts an exemplary extract creation process according to an embodiment of our technology.

Turning now to FIG. 13, aspects of an extraction process are provided, which include an initiation step 1310. A user can select a project at a step 1312, which is received by the system. The system can also receive a selection from the user that indicates a desire to select a collect set at a step 1314. As stated previously, an individual project may be associated with multiple collect sets. However, it is possible that a single collect set is associated with the project, in which case the collect set may be autoselected. As shown in FIGS. 19-22, the project and collect set could be selected from a drop-down menu. Other selection methods are also possible.

At step 1316, a determination is made whether a user wants to use an existing extract. If a user does not wish to utilize an existing extract to query the point-cloud database then a new extract is created following a process which starts at step 1320. If an existing extract is to be utilized, then the user selects an existing extract at step 1318. From there, the data extraction proceeds using the previously defined extract as is explained in more detail in FIG. 14. As described previously, an extract may be thought of as a query for the portion of the point-cloud to be retrieved.

At step 1320, the centerline collect extent is queried. A centerline collect extent will be utilized subsequently to give a user options to select or designate an area for the point-cloud to select.

At step 1322, the point-cloud extent is queried. As described previously, the extent is the outer boundaries of the area captured in the survey. The point-cloud extent may be used to show which areas on a map may be queried.

Figure 19:
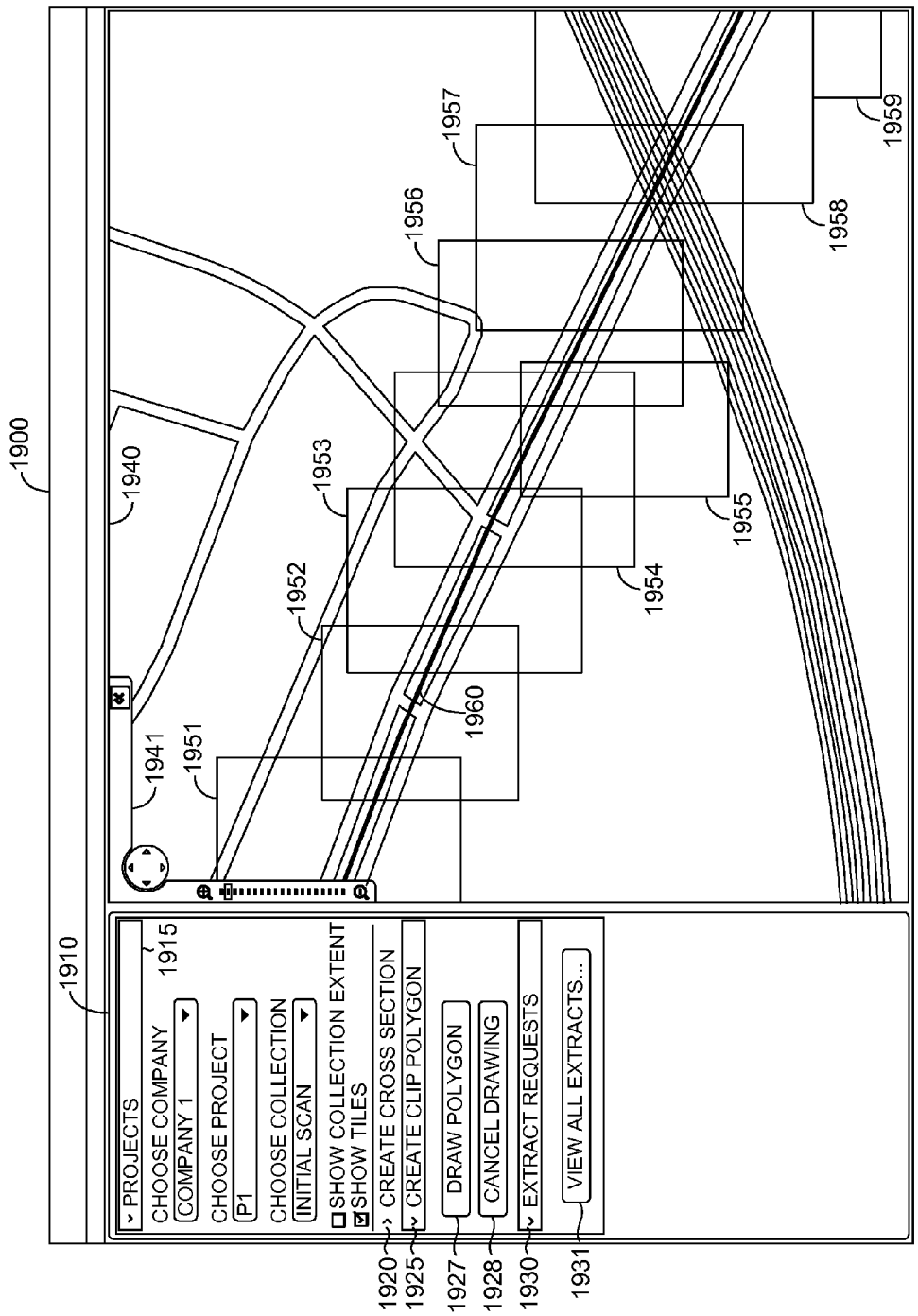
FIG. 19 depicts an extract-generation interface according to an embodiment of our technology.
Figure 20:
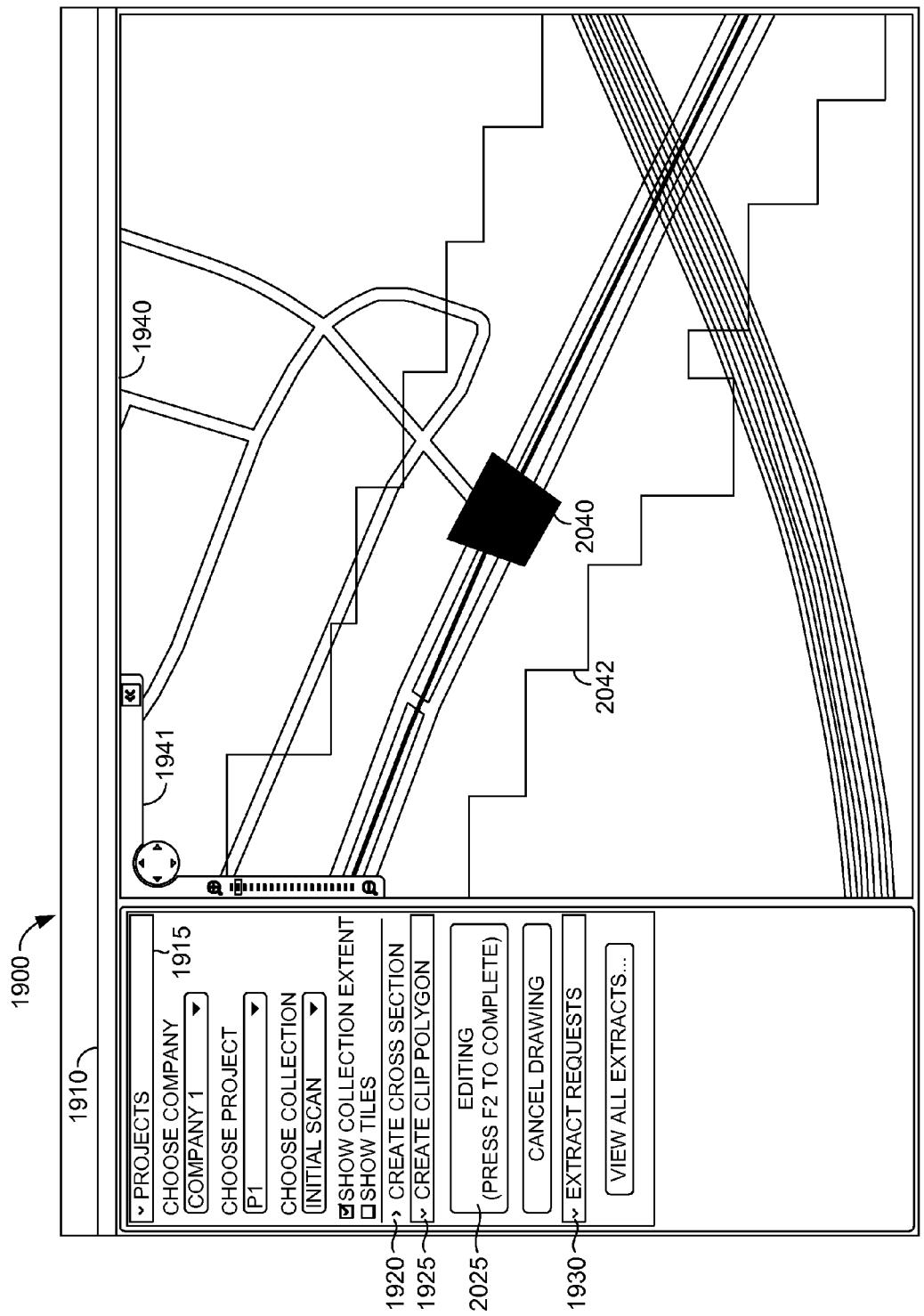
FIG. 20 depicts an extract-generation interface according to an embodiment of our technology.
Figure 21:
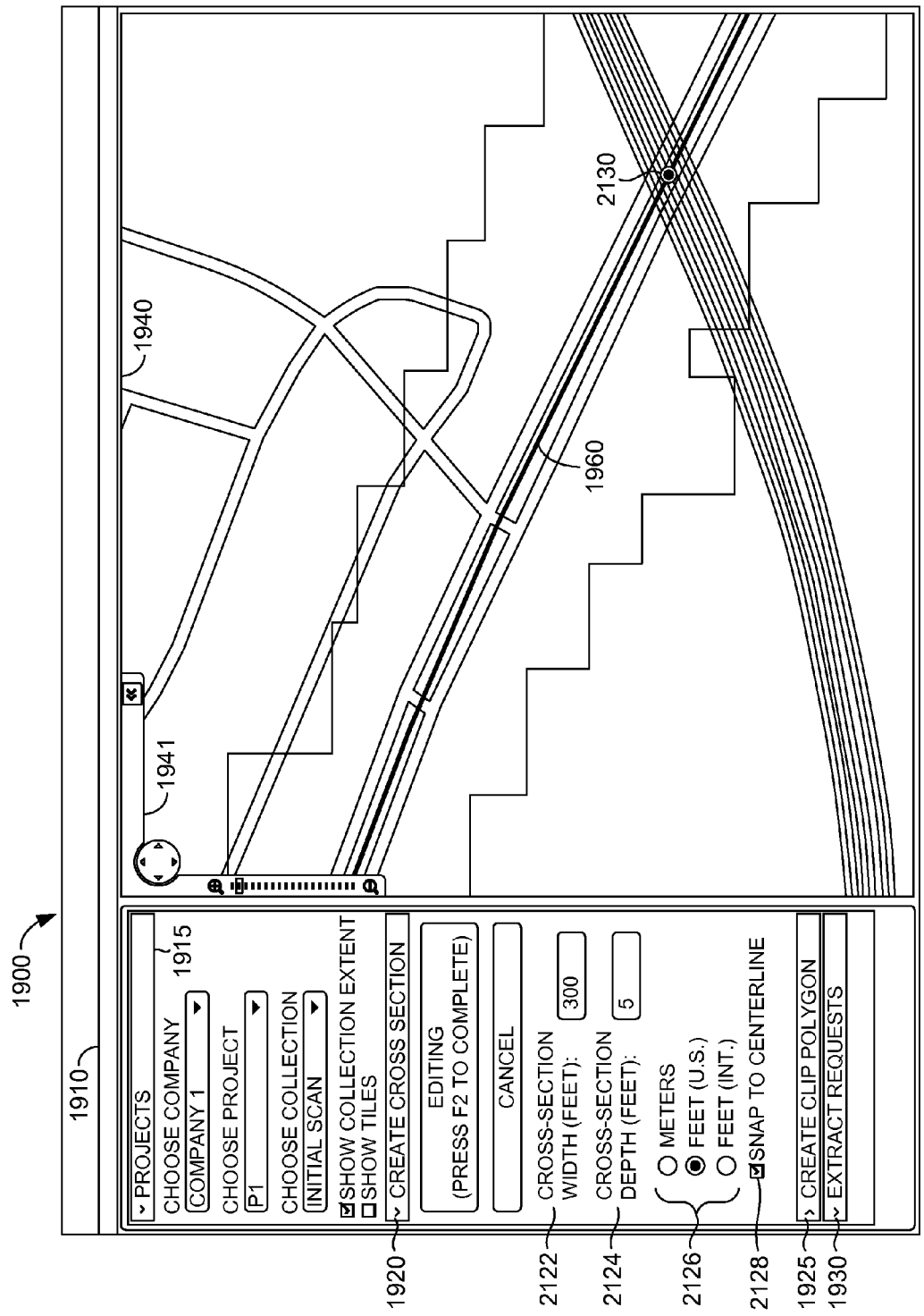
FIG. 21 depicts an extract-generation interface according to an embodiment of our technology.

At step 1324, a determination is made whether an application through which the extract is generated uses map data. If the application utilizes map data, then at step 1326 a map is displayed to the user through a user interface. If the application does not use a map, then the centerline is displayed to the user at step 1328. As can be seen from the relationship between step 1326 and step 1328, if a map is used, the centerline may be displayed overlaid on the map. Similarly, at step 1330, the point-cloud extent polygons may be overlaid over the map or in the case where no map is available displayed overlaid or in relationship to the centerline. An example of displaying the extents is shown in FIGS. 20 and 21. In FIG. 19, the extents are displayed as individual tiles.

At step 1332, a user selects one or more data filters. Sample filters include excluding certain points representing foliage or other features included in the point-cloud data.

At step 1334, the user selects an extract type. Embodiments of our technology allow a user to specify the extract shape as a clipped polygon or a cross section. Other shapes may also be used but these two shapes are used in the example process explained in FIG. 13. At step 1336, it is determined whether the user selected a clipped polygon or a cross section.

If the user specifies a clipped polygon, at step 1338, the user defines the extract polygon. The user may define the extract polygon by typing in the data points corresponding to the corners of the polygon. In another embodiment, a user draws a polygon on a map using a drawings tool. Once the polygon is drawn, the extract record is saved at step 1354. As described previously, the extract record includes the area to be queried along with data filters, if applicable.

If the user specifies a cross section then at step 1340, the user enters the width, height, and depth of the cross section. At step 1342, the user specifies a point on the map. The point may be a point along the centerline or another point on the map. At step 1344 it is determined whether the user has a GPS capable device and further, whether the user desires to utilize GPS information to specify a point on the map. If the user wishes to use the GPS data then at step 1352, the GPS location is used to specify a point on the map. Further, the device orientation is used to draw a line from the point in the direction the device is oriented toward the centerline. The user's previously specified dimensions are then used to generate a cross section.

If the user does not have, or does not wish to use the GPS data, then, the closest point on the centerline from the point specified is calculated at step 1346. At step 1348, a normal line is calculated at the point on the centerline. At step 1350, the user-defined dimensions are applied to generate an extract in the form of a cross section. At step 1356, the extract record is saved. Saving the extract record allows it to be used in the future to retrieve point-cloud data. If at step 1354, if is determined that the extract record is not saved, then the data extraction (step 1358) may proceed according to the process in FIG. 14.

Figure 14:
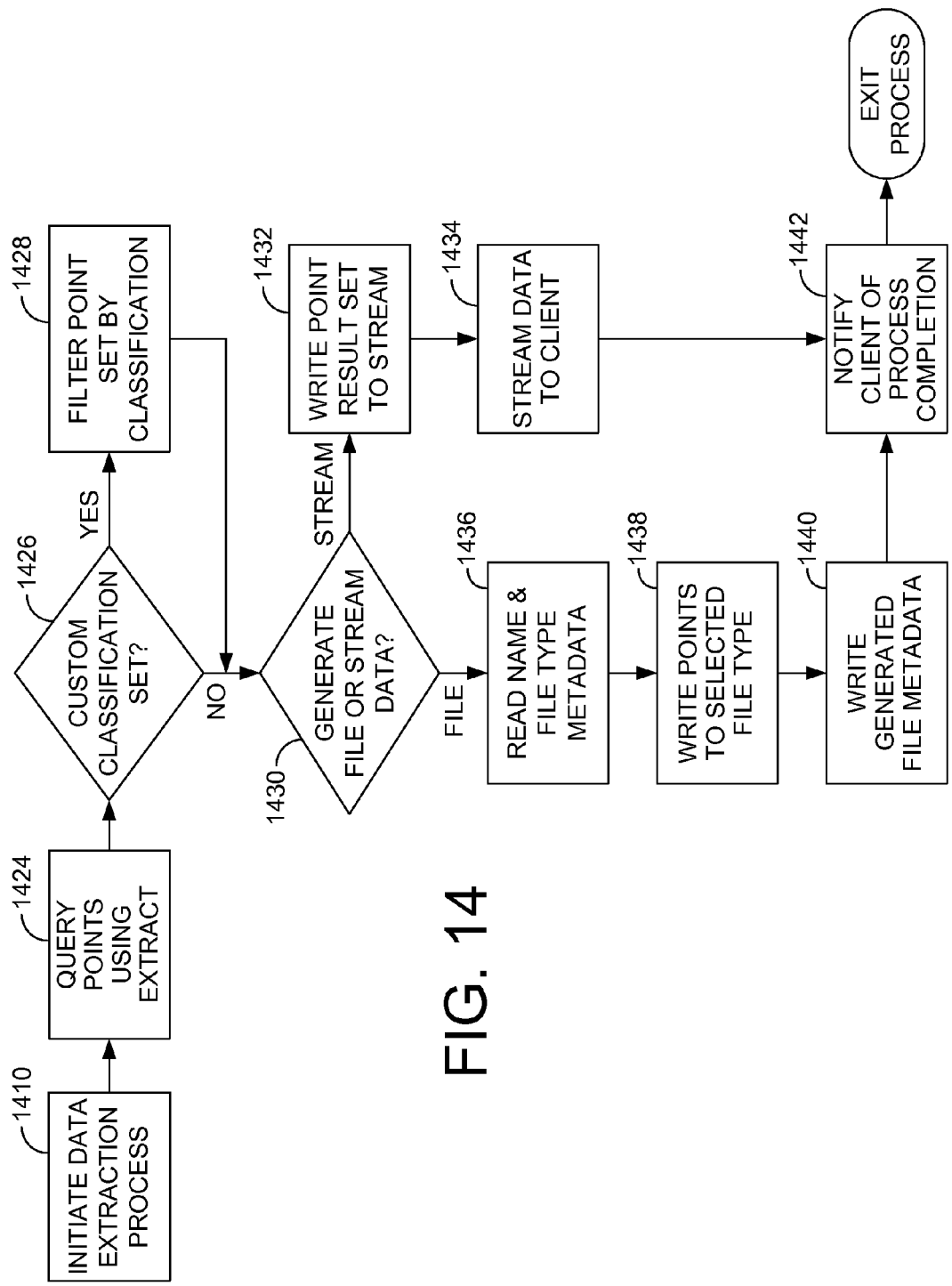
FIG. 14 depicts an exemplary extraction process according to an embodiment of our technology.

Turning now to FIG. 14, a data extraction process is described, in accordance with an embodiment of the present invention. At step 1410, the data extraction process is initiated. At step 1424, the points in the database are queried using the extract generated previously in FIG. 13. As described previously, the extract acts as a type of search query that defines the part of the database to be searched. At step 1426, a determination is made whether or not a custom classification set has been requested. A custom classification set is requested when various filter parameters have been specified. If a custom classification set has been requested at step 1426, then various filters are applied to generate a dataset.

At step 1430, a determination is made whether to use the extract to generate a point-cloud file or to stream the data. If a determination is made that the user requested a data stream then at step 1432, the point result set is written into a data stream. At step 1434, the data is streamed to the client device. At step 1442, the client is notified when the data stream process is complete at which time the user will have received the point-cloud specified by the extract.

If a determination is made that the user wants a file, then at step 1436, a file name and file type metadata is generated. In one embodiment files are named sequentially as requests are received. Other naming conventions may be utilized.

At step 1438, the points are written to the selected file type. At step 1440, the generated file metadata is written. At step 1442, the client is notified of the process completion and then the process exits.

Figure 15:
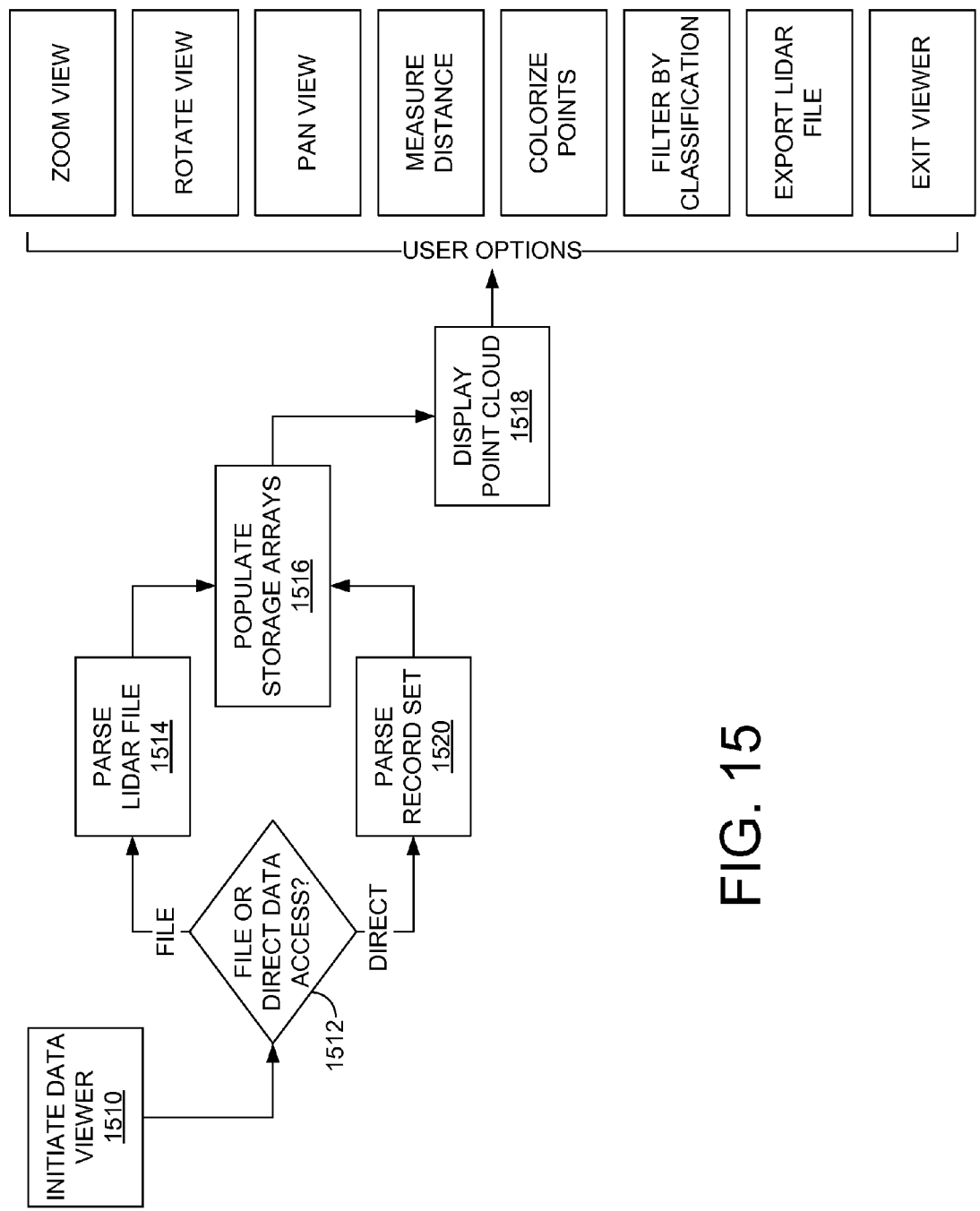
FIG. 15 depicts an exemplary data-viewing process according to embodiments of our technology.

Turning now to FIG. 15, additional aspects associated with initiating a data-viewer process are provided. The process can be initiated at a step 1510. A determination is made as to whether access is to be by way of a file or direct data at a step 1512. If file, then the applicable LiDAR file is parsed at a step 1514. The storage arrays associated with the data from the parsed LiDAR file are populated at a step 1516. This enables the display of the corresponding point-cloud at a step 1518. Various user options are associated with displaying the point-cloud. Exemplary options include an ability to zoom, rotate, pan, measure distance, colorize points, filter by classification, export a LiDAR file, or exit the viewer.

Returning to the determination step 1512, if the direct-data access approach was to be taken, then processing would advance to a step 1520 in one embodiment whereby the record set is parsed. The data that stemmed from parsing a record set is populated into one or more storage arrays in step 1516, whereby processing advances to the aforementioned step 1518.

Figure 16:
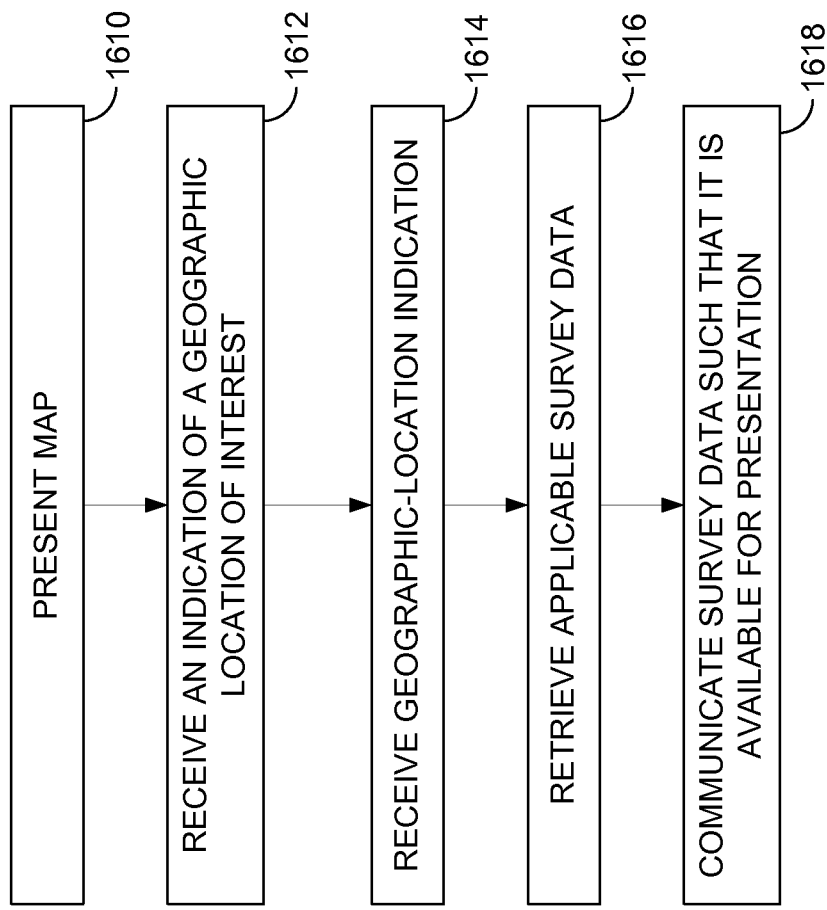
FIG. 16 depicts an exemplary process for leveraging the data obtained and optimized according to an embodiment of our technology.

FIG. 16 provides additional information associated with an exemplary use case that is made possible as a result of being able to leverage the data that was acquired, optimized, and made available as we have previously described. At a step 1610, a map is presented to a user. An exemplary user could be a data surveyor in the field. Another user might be someone located a thousand miles away with access to the Internet who desires to have a presentation of survey data made.

At a step 1612, an indication of a specific geographic location is received. In one embodiment, this could be accomplished by way of a user lassoing a geographic area on a map. In another embodiment, this could take the form of a surveyor using a mobile device to indicate a geographic area of interest.

The indicated geographic area of interest is communicated to the server-side components at a step 1614. In one embodiment, this includes communicating the information to remote components 314 of FIG. 3.

The remote components 314 receive the geographic-area indication and use the same to submit a query by way of database server 332 to receive back relevant survey data from the project datasets 334 or other stored data. This enables the receiving device, such as the surveyor's mobile device or PC, to receive back survey data that is applicable to the indicated geographical area of interest at a step 1616. In one embodiment, the survey data is presented by way of the user's device at a step 1618. This depiction can take the form of a pictorial illustration that pictorially shows the results of the survey information, such as the location of objects such as telephone poles, structures, etc. In other embodiments, depicting the survey data could include printing a narrative, or a grid or table form.

Turning now to FIG. 17, a method of creating database entry commands is shown, in accordance with an embodiment of the present invention. At step 1710, construction of a job-loading command queue is initiated. The job-loading command queue holds job-loading commands for each file uploaded from the acquisition server or acquisition device to the remote storage. Construction of the job-loading command queue may occur as files are received at the remote storage location or after all of the files have been received at the remote storage location. Uploading the files to the remote storage location has been described previously with reference to FIGS. 10 and 11. Thus, files loaded into the database through the methods described in FIG. 17 and subsequently in FIG. 18 may be the files received in the exemplary method described in FIG. 11.

At step 1720, a file is determined to exist in the LiDAR table, and, therefore, be available for processing. Again, the files listed in the LiDAR table may be those received at the remote storage from an acquisition device. At step 1724, an input command is built for an individual file in the LiDAR table. The command includes instructions for inserting data from the LiDAR file into the database. The command may be executed by a program designed to insert data into a spatial database. In one embodiment, the las2oci program is used to insert the data from the LiDAR files into the spatial database.

At step 1726, the input command built at step 1724 is added to the job-loading command queue. In order to build the commands, the program that's loading the data into the database builds an index over the .las file, organizes the points together by location, and inserts the points into the database using native data types. The database is queried to get the necessary parameters needed to store with the point-cloud record and then the individual command is inserted into the queue table.

At step 1728, it is determined whether additional files exist in the LiDAR table for which input commands have not been built. If commands need to be built for additional files, then the process returns to step 1720 and repeats until each file in the LiDAR table has an input command associated with it built and stored in the command queue. When a command has been built for the last file in the LiDAR table, the process continues to step 1730 where each .shp file in the centerline table is processed.

At step 1732, an input command is built for a first file in the centerline table. At step 1734, that input command is added to a command queue table. The command queue table tracks the input commands associated with the centerline table. At step 1736, it is determined whether all .SHP files in the centerline table have been associated with an input command. If not, the process returns to step 1730 and repeats until each file in the centerline table has been associated with an input command. If the last file has been processed, then the process exits. The input commands for the LiDAR files and .SHP files are then utilized in the process described in FIG. 18 to enter the data into a spatial database.

Turning now to FIG. 18, a method of loading data into a spatial database is described, in accordance with an embodiment of the present invention. At step 1810, the job-loading service is initiated. The job-loading service may be an application built to load point-cloud data into a spatial database. At step 1812, the service is started. A termination may be requested at step 1815. In this case, the process is terminated and exits. The termination may be requested during various points in the uploading process, in which case the process is terminated.

At decision point 1814, it is determined whether job commands are present in the queue. The queue may be alternatively referred to as a table. If yes, at step 1816, for each job in the command queue table at step 1818 the command is run. The queue process or program that reads the commands out of the database executes those commands. If the command is for a .las file, the .las file is moved from the storage to the stage server. Then, the extents and point count is collected from it. After that is completed, the command is executed and the points are loaded into the database. If the queue processor finds an .shp file record, that file is moved from the storage server and a special program is run to store the parameters from the .shp file in the database.

At step 1820, the job status is updated. The job status update may reflect the progress made in running a command in step 1818. At step 1822, the project extents are updated. The project extents may be the boundary of the data collected in the point-cloud. Project extents may be updated utilizing data from the .shp files or centerline files. In another embodiment, the point-cloud data from the .las files is analyzed to generate the new extents as data is added to the database. Updating the extents comprises merging the current extent area with the accumulated project extent area.

At step 1824, it is determined whether the last job in the command queue table has been run. If not, then the process returns to step 1816 where additional commands in the queue are processed. If not, the process waits a specified interval at step 1826 and then terminates if no additional jobs are present in the command table. In another embodiment, a manual termination request, such as that in 1815, is required to terminate the process. In one embodiment, the interval is 5 minutes.

Turning now to FIG. 19, an extract interface is shown, in accordance with an embodiment of the present invention. In one embodiment, the extract interface 1900 is displayed on a client device. The extract establishes the parameters to query a point-cloud database. The extract may define the geographic boundaries of a queried volume of data. The extracts may also specify various data filters and other parameters for the data sought.

The extract interface 1900 includes a parameters portion 1910 and an interactive map portion 1940. The parameters portion 1910 includes a projects interface 1915, a cross-section interface 1920, a clip polygon interface 1925, and an extract request interface 1930. The projects interface 1915 allows the user to specify a project from which data may be extracted. In the example shown, the project interface 1915 allows a user to select a company, choose a project, and choose a collection. As described previously, projects may be associated with different companies. In one embodiment, upon selecting a company all projects associated with that company are automatically populated into the project selection box from which one of the projects may be selected. An individual project may include multiple data collections. In this case, the "initial scan" collect set is selected. Individual projects may include collections that overlap. For example, different collections may be associated with the scans that occur at different time periods during the project. Finally, the project interface 1915 allows the user to specify whether the collection extent is shown or tiles within the collection are shown. In this case the "show tiles box" is selected. As will be explained in more detail, the individual titles are then displayed in the maps portion 1940.

The cross-section interface 1920 allows a user to define the boundaries of an extract request using a cross section. This option will be explained in more detail with reference to FIGS. 21 and 22.

The clip polygon interface 1925 allows a user to specify the boundaries of an extract request by drawing a polygon within the maps portion 1940. To activate the polygon drawing tool, the user clicks the draw polygon button 1927. The cancel drawing button 1928 allows the user to escape from the selected polygon and start over if they wish. The extract-request interface 1930 allows the user to specify various parameters of the extract, including defining one or more filers. The view extracts button 1930 allows the user to choose from previously generated extract requests. If the user does not find one that is suitable, they may proceed to create a new extract request.

The maps portion 1940 includes a map of the project area. A user may navigate through the project area using the controls 1941 in the upper left corner which allow a user to zoom in, to zoom out, and to scroll north, south, east, or west. Tiles within the selected project and within the selected collection are shown on the map. The tiles include tile 1951, tile 1952, tile 1953, tile 1954, tile 1955, tile 1956, tile 1957, tile 1958, and tile 1959. As can be seen, the tiles are more or less centered on centerline 1960. In this case, the centerline 1960 follows a road on the map. As can be seen, the tiles may overlap with one or more other tiles.

Turning now to FIG. 20, an extract interface is shown, in accordance with an embodiment of the present invention. The extract interface 1900 shown in FIG. 20 is in many respects similar to the extract interface 1900 shown in FIG. 19. FIG. 20 illustrates a further step in the process of selecting a boundary for an extract request using a clip polygon. As can be seen, a clip polygon 2040 has been drawn in map portion 1940. Further, an editing button 2025 has been added to the clip polygon interface 1925. The editing button 2025 instructs a user to finalize the clip polygon by pushing F2 to complete. Other methods of finalizing the polygon are possible, for example, an additional button could be added to the extract interface 1900.

Another difference between FIG. 19 and FIG. 20 is that, for the sake of illustration, the show collection extent box has been checked rather than the show tiles box. As can be seen, a collection extent line 2042 has been added to the map portion 1940 in place of the tiles. The collection extent shows the outer boundary of the tiles. This represents the area for which survey data is available. Once the polygon is finalized, the user may specify other parameters of the extract request and then submit the request to a database storing the survey data. A point-cloud or other rendering of the extract request may be displayed in a separate interface. The methods in which an extract request may be used to process and retrieve data have been described previously.

Turning now to FIG. 21, the extract interface 1900 is shown, in accordance with an embodiment of the present invention. FIG. 21 illustrates selecting a boundary for the extract request using a cross section.

As can be seen, the create cross-section interface 1920 is expanded while the polygon interface 1925 is collapsed. The width interface 2122 allows the user to specify the desired width for a cross section area. In the example shown, the width has been specified as 300 feet. The depth interface 2124 allows a user to specify the depth of the cross section area. As can be seen, the depth has been specified at 5 feet. The units' interface 2126 allows the user to select a unit of measure. The snap interface 2128 allows the user to snap to a centerline to make creation of the cross section area easier. As can be seen, a point 2130 to build the cross section area on has been snapped to centerline 1960.

Figure 22:
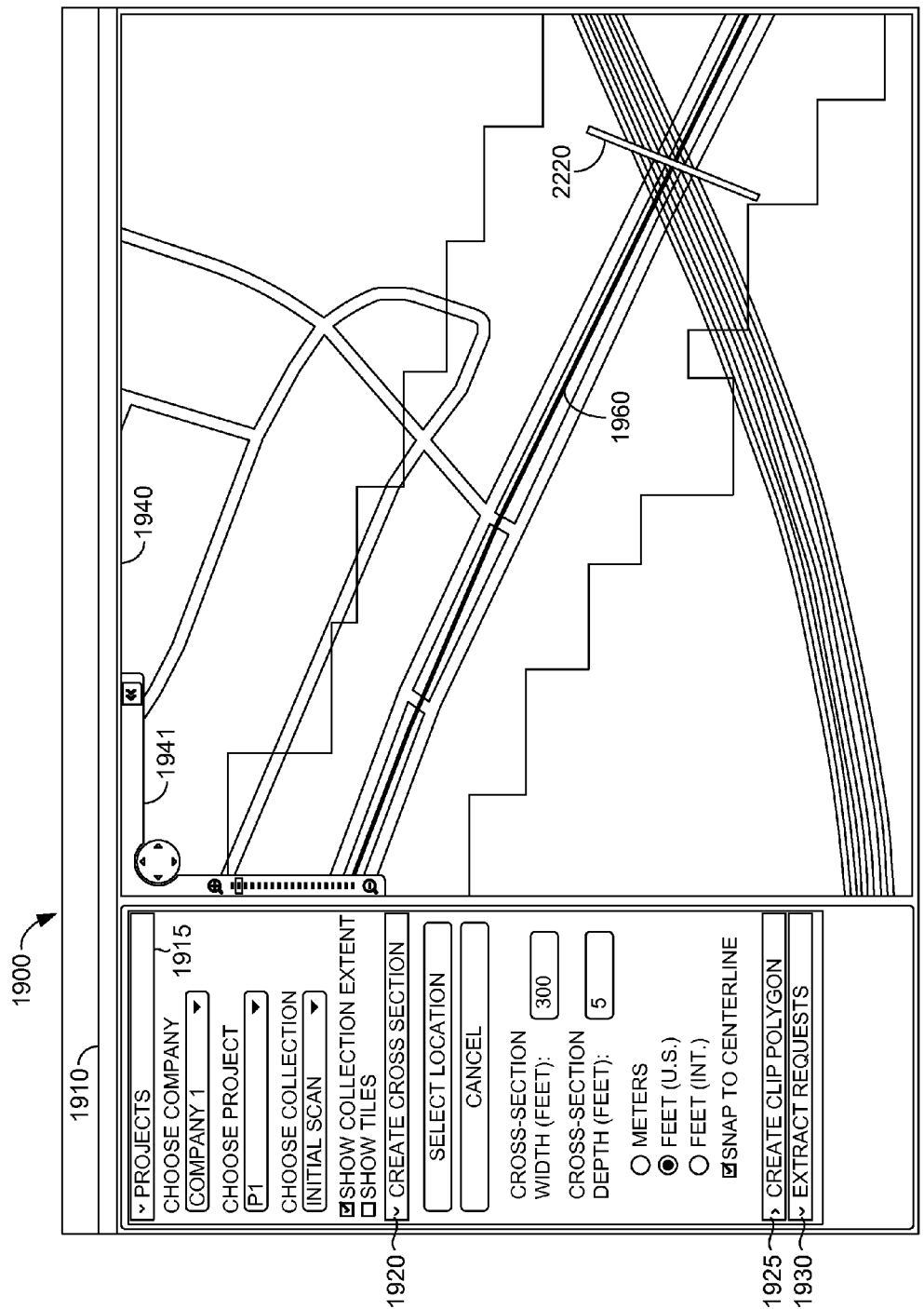
FIG. 22 depicts an extract-generation interface according to an embodiment of our technology.

Turning now to FIG. 22, the extract interface 1900 is shown, in accordance with an embodiment of the present invention. FIG. 22 shows a completed cross section 2220. The cross section 2220 has been built by drawing a cross section perpendicular to the centerline 1960 from the point 2130 specified previously. The cross section has the depth and width specified within the cross section interface 1920.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description.

The invention claimed is:

1. A method of managing survey data, the method comprising:
    generating, at a computing device, an extract that defines a geographic area of interest, wherein the extract is a query for a portion of a point cloud, and wherein a point cloud is a set of points arranged in a three-dimensional coordinate system;
    communicating the extract to a remote storage system that comprise a spatial database that stores Light Detection and Ranging ("LiDAR") point cloud survey data; and
    receiving a set of point cloud data describing the geographic area of interest defined by the extract.

2. The method of claim 1, wherein the geographic area of interest is a cross-section area that is specified by a width, a height, and a depth.

3. The method of claim 2, wherein the cross-section area is generated at a point specified on a map.

4. The method of claim 1, wherein the geographic area of interest is defined by drawing a shape on a map that shows extents of a selected project.

5. The method of claim 1, wherein the set of point cloud data is received in a data stream generated by the remote storage system.

6. The method of claim 1, wherein the survey data is generated using a combination of GPS, inertial measuring, LiDAR and digital imaging data to generate a three-dimensional spatial description of an area in the form of a point cloud.

7. The method of claim 1, wherein the set of point cloud data is written into a data stream for transport.

8. The method of claim 1, wherein the set of point cloud data is received in an LAS file.

9. The method of claim 1, further comprising displaying the set of point cloud data at the computing device.

10. A non-transitory computer-readable media having computer-executable instructions embodied thereon that, when executed, perform a method of managing survey data, the method comprising:
    generating, at a computing device, an extract that defines a geographic area of interest, wherein the extract is a query for a portion of a point cloud, and wherein a point cloud is a set of points arranged in a three-dimensional coordinate system;
    communicating the extract to a remote storage system that comprise a spatial database that stores Light Detection and Ranging ("LiDAR") point cloud survey data; and
    receiving a set of point cloud data describing the geographic area of interest defined by the extract.

11. The media of claim 10, wherein the geographic area of interest is a cross-section area that is specified by a width, a height, and a depth.

12. The media of claim 11, wherein the cross-section area is generated at a point specified on a map.

13. The media of claim 10, wherein the geographic area of interest is defined by drawing a shape on a map that shows extents of a selected project.

14. The media of claim 10, wherein the set of point cloud data is received in a data stream generated by the remote storage system.

15. The media of claim 10, wherein the set of point cloud data is received in a file.

16. The media of claim 10, wherein the method further comprises saving the extract for reuse.

17. The media of claim 10, wherein the survey data is generated using a combination of GPS, inertial measuring, LiDAR and digital imaging data to generate a three-dimensional spatial description of an area in the form of a point cloud.

18. The media of claim 10, wherein the set of point cloud data is filtered to exclude points that do not conform to a filter criteria.

* * * * *